(12) United States Patent
Tran et al.

(10) Patent No.: US 6,253,316 B1
(45) Date of Patent: Jun. 26, 2001

(54) THREE STATE BRANCH HISTORY USING ONE BIT IN A BRANCH PREDICTION MECHANISM

(75) Inventors: Thang M. Tran; Andrew McBride; Karthikeyan Muthusamy, all of Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/438,963

(22) Filed: Nov. 12, 1999

Related U.S. Application Data

(63) Continuation-in-part of application No. 09/366,809, filed on Aug. 4, 1999, now Pat. No. 6,141,748, which is a continuation of application No. 08/957,596, filed on Oct. 24, 1997, now Pat. No. 5,978,906, which is a continuation-in-part of application No. 08/752,691, filed on Nov. 19, 1996, now Pat. No. 5,995,749, application No. 09/438,963, which is a continuation-in-part of application No. 09/401,561, filed on Sep. 22, 1999, which is a continuation of application No. 08/752,691.

(51) Int. Cl.$^7$ ............................. G06F 9/44; G06F 9/42; G06F 9/32

(52) U.S. Cl. ................... 712/239; 712/239; 712/240; 712/237

(58) Field of Search ...................... 712/239, 240, 712/23, 237, 22, 233, 242

(56) References Cited

U.S. PATENT DOCUMENTS

| | | | |
|---|---|---|---|
| 4,179,737 | 12/1979 | Kim | 712/241 |
| 4,860,197 | 8/1989 | Langendorf et al. | 712/238 |
| 5,142,634 | 8/1992 | Fite et al. | 712/237 |
| 5,265,213 | 11/1993 | Weiser et al. | 712/240 |
| 5,367,703 | * 11/1994 | Levitan | 712/23 |
| 5,381,533 | 1/1995 | Peleg et al. | 712/215 |

(List continued on next page.)

FOREIGN PATENT DOCUMENTS

| | | |
|---|---|---|
| 0 199 947 | 11/1986 | (EP) . |
| 0 394 711 | 10/1990 | (EP) . |
| 0 586 057 | 3/1994 | (EP) . |
| 0 605 876 | 7/1994 | (EP) . |
| 2 285 526 | 7/1995 | (GB) . |
| 93/17385 | 9/1993 | (WO) . |
| 98/22873 | 5/1998 | (WO) . |

OTHER PUBLICATIONS

Calder et al., "Next Cache Line and Set Prediction," Computer Architecture News, vol. 23, No. 2, May 1995, pp. 287–296.

(List continued on next page.)

Primary Examiner—Daniel H. Pan
(74) Attorney, Agent, or Firm—Conley, Rose & Tayon, PC; Lawrence J. Merkel

(57) ABSTRACT

A branch prediction unit stores a set of branch prediction history bits and branch selectors corresponding to each of a group of contiguous instruction bytes stored in an instruction cache. While only one bit is used to represent branch prediction history, three distinct states are represented in conjunction with the absence of a branch prediction. This provides for the storage of fewer bits, while maintaining a high degree of branch prediction accuracy. Each branch selector identifies the branch prediction to be selected if a fetch address corresponding to that branch selector is presented. In order to minimize the number of branch selectors stored for a group of contiguous instruction bytes, the group is divided into multiple byte ranges. The largest byte range may include a number of bytes comprising the shortest branch instruction in the instruction set (exclusive of the return instruction). For example, the shortest branch instruction may be two bytes in one embodiment. Therefore, the largest byte range is two bytes in the example. Since the branch selectors as a group change value (i.e. indicate a different branch instruction) only at the end byte of a predicted-taken branch instruction, fewer branch selectors may be stored than the number of bytes within the group.

21 Claims, 17 Drawing Sheets

U.S. PATENT DOCUMENTS

| | | | |
|---|---|---|---|
| 5,454,117 | 9/1995 | Puziol et al. | 712/23 |
| 5,553,253 | 9/1996 | Pan et al. | 712/240 |
| 5,553,254 | 9/1996 | Berstis et al. | 712/207 |
| 5,592,634 | 1/1997 | Circello et al. | 712/239 |
| 5,608,886 | 3/1997 | Blomgren et al. | 712/32 |
| 5,642,500 | 6/1997 | Inoue | 712/233 |
| 5,649,137 | 7/1997 | Favor et al. | 712/207 |
| 5,649,178 | 7/1997 | Blaner et al. | 712/240 |
| 5,692,168 | 11/1997 | McMahan | 712/237 |
| 5,708,803 | 1/1998 | Ishimi et al. | 712/233 |
| 5,732,253 | 3/1998 | McMahan | 712/240 |
| 5,737,590 | 4/1998 | Hara | 712/238 |
| 5,740,417 * | 4/1998 | Kennedy et al. | 712/239 |
| 5,758,142 | 5/1998 | McFarling et al. | 712/234 |
| 5,764,946 | 6/1998 | Tran et al. | 712/239 |
| 5,794,028 | 8/1998 | Tran | 712/240 |
| 5,822,574 | 10/1998 | Tran | 712/233 |
| 5,822,575 | 10/1998 | Tran | 712/239 |
| 5,864,707 | 1/1999 | Tran et al. | 712/23 |
| 5,881,278 | 3/1999 | Tran et al. | 712/242 |
| 5,954,816 | 9/1999 | Tran et al. | 712/233 |
| 5,961,638 | 10/1999 | Tran | 712/239 |
| 5,978,906 | 11/1999 | Tran | 712/239 |
| 5,995,749 | 11/1999 | Tran | 712/239 |

OTHER PUBLICATIONS

McFarling, "Combining Branch Predictors," WRL Technical Note TN–36, Jun. 1993, pp. 1–20.

Kaiser, "K7 Branch Prediction," © 1999 by Andreas Kaiser, 4 pgs.

Diefendorff, "Athlon Outruns Pentium III," Microprocessor Report, vol. 13, No. 11, Aug. 1999, 7 pgs.

* cited by examiner

Single Bit State Machine

|  | 1 | 2 | 3 | 4 | 5 | 6 | 7 | 8 | 9 | 10 |
|---|---|---|---|---|---|---|---|---|---|---|
| Current State | NT | T | T | T | T | T | T | T | T | T |
| Prediction | NT | T | T | T | T | T | T | T | T | T |
| Actual | T | T | T | T | T | T | T | T | T | NT |
| Next State | T | T | T | T | T | T | T | T | T | NT |

Single Bit History – First Iteration 80% Accuracy

|  | 1 | 2 | 3 | 4 | 5 | 6 | 7 | 8 | 9 | 10 |
|---|---|---|---|---|---|---|---|---|---|---|
| Current State | NT | T | T | T | T | T | T | T | T | T |
| Prediction | NT | T | T | T | T | T | T | T | T | T |
| Actual | T | T | T | T | T | T | T | T | T | NT |
| Next State | T | T | T | T | T | T | T | T | T | NT |

Single Bit History – Subsequent Iteration 80% Accuracy

Two Bit State Machine

|  | 1 | 2 | 3 | 4 | 5 | 6 | 7 | 8 | 9 | 10 |
|---|---|---|---|---|---|---|---|---|---|---|
| Current State | WN | WT | ST | ST | ST | ST | ST | ST | ST | ST |
| Prediction | NT | T | T | T | T | T | T | T | T | T |
| Actual | T | T | T | T | T | T | T | T | T | N |
| Next State | WT | ST | ST | ST | ST | ST | ST | ST | ST | WT |

Two Bit History – First Sequence 80% Accuracy

|  | 1 | 2 | 3 | 4 | 5 | 6 | 7 | 8 | 9 | 10 |
|---|---|---|---|---|---|---|---|---|---|---|
| Current State | WT | ST | ST | ST | ST | ST | ST | ST | ST | ST |
| Prediction | T | T | T | T | T | T | T | T | T | T |
| Actual | T | T | T | T | T | T | T | T | T | N |
| Next State | ST | ST | ST | ST | ST | ST | ST | ST | ST | WT |

Two Bit History – Subsequent Sequence 90% Accuracy

Single Bit State Machine

|  | 1 | 2 | 3 | 4 | 5 | 6 | 7 | 8 | 9 | 10 |
|---|---|---|---|---|---|---|---|---|---|---|
| Current State | NT | WT | ST | ST | ST | ST | ST | ST | ST | ST |
| Prediction | N | T | T | T | T | T | T | T | T | T |
| Actual | T | T | T | T | T | T | T | T | T | N |
| Next State | WT | ST | ST | ST | ST | ST | ST | ST | ST | WT |

Single Bit History – First Iteration 80% Accuracy

|  | 1 | 2 | 3 | 4 | 5 | 6 | 7 | 8 | 9 | 10 |
|---|---|---|---|---|---|---|---|---|---|---|
| Current State | WT | ST | ST | ST | ST | ST | ST | ST | ST | ST |
| Prediction | T | T | T | T | T | T | T | T | T | T |
| Actual | T | T | T | T | T | T | T | T | T | N |
| Next State | ST | ST | ST | ST | ST | ST | ST | ST | ST | WT |

Single Bit History – Subsequent Iteration 80% Accuracy

| Byte Position | 0 | 1 | 2-3 | 4-5 | 6-7 | 8-9 | A-B | C-D | E-F |
|---|---|---|---|---|---|---|---|---|---|
| Branch Selector Position | 0 | 1 | 2 | 3 | 4 | 5 | 6 | 7 | 8 |
| Read Addresses | 0000 | 0001 | 001x | 010x | 011x | 100x | 101x | 110x | 111x |
| Encoding Addresses | 0000 | 0001 0010 | 0011 0100 | 0101 0110 | 0111 1000 | 1001 1010 | 1011 1100 | 1101 1110 | 1111 |

| Byte Position | E | F | 0 | 1 |
|---|---|---|---|---|
| Instruction | IN0 | PB0 | | IN1 |
| Branch Selector | 0 | | 3 | 2 |

80

| Byte Position | 2 | 3 | 4 | 5 |
|---|---|---|---|---|
| Instruction | IN0 | PB0 | | RET |
| Branch Selector | 3 | | 1 | |

82

| Byte Position | 2 | 3 | 4 | 5 |
|---|---|---|---|---|
| Instruction | PB0 | | RET | IN1 |
| Branch Selector | 3 | | 0 | |

Figure 18

| Byte Position | 3 | 4 | 5 | 6 | 7 | 8 |
|---|---|---|---|---|---|---|
| Instruction | IN0 | RET | PB0 | | IN1 | |
| Branch Selector | 1 | 3 | | 0 | | 0 |

Figure 19

Branch Selector Encoding

| Encoding (Binary) | Branch Prediction |
|---|---|
| 00 | Sequential |
| 01 | Return Stack |
| 10 | Branch Prediction 1 |
| 11 | Branch Prediction 2 |

Figure 20 — 138

| Byte Position | 0 | 1-2 | 3-4 | 5-6 | 7-8 | 9-A | B-C | D-E | F |
|---|---|---|---|---|---|---|---|---|---|
| Branch Selector Position | 0 | 1 | 2 | 3 | 4 | 5 | 6 | 7 | 8 |
| Read Addresses | 0000 | 0001 0010 | 0011 0100 | 0101 0110 | 0111 1000 | 1001 1010 | 1011 1100 | 1101 1110 | 1111 |
| Encoding Addresses | 0000 | 0001 | 001x | 010x | 011x | 100x | 101x | 110x | 111x |

THREE STATE BRANCH HISTORY USING ONE BIT IN A BRANCH PREDICTION MECHANISM

CROSS REFERENCE TO RELATED APPLICATIONS

This application is a continuation in part of U.S. patent application Ser. No. 09/366,809, filed Aug. 4, 1999, now U.S. Pat. No. 6,141,748, issued on Oct. 31, 2000, which is a continuation of U.S. patent application Ser. No. 08/957, 596 filed Oct. 24, 1997, now U.S. Pat. No. 5,978,906, issued on Nov. 2, 1999, which is a continuation in part of U.S. patent application Ser. No. 08/752,691, filed Nov. 19, 1996 (which includes a continued prosecution application filed Jul. 14, 1999), now U.S. Pat. No. 5,995,749, issued Nov. 30, 1999. This application is also a continuation in part of co-pending U.S. patent application Ser. No. 09/401,561 filed Sep. 22, 1999, which is a continuation of U.S. patent application Ser. No. 08/752,691, filed Nov. 19, 1996 (which includes a continued prosecution application filed Jul. 14, 1999), now U.S. Pat. No. 5,995,749, issued Nov. 30, 1999. The disclosure of these patent applications are incorporated herein by reference in their entirety.

BACKGROUND OF THE INVENTION

1. Field of the Invention

This invention is related to the field of microprocessors and, more particularly, to branch prediction mechanisms within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetching to continue within the predicted instruction stream indicated by the branch prediction. A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory. Unconditional branch instructions always branch to the target address, while conditional branch instructions may select either the sequential or the target address based on the outcome of a prior instruction. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Typically, increasing the accuracy of the branch prediction mechanism is achieved by increasing the complexity of the branch prediction mechanism. For example, the history of branch predictions may be represented by one or more bits stored in the branch prediction unit. By recording the history of the behavior of a branch, more accurate predictions may be made as to its likely behavior in the future. Generally, by increasing the number of bits used to track branch prediction history, a more complete history may be recorded and the accuracy of branch predictions may likewise be increased.

Frequently, two bits are used to represent branch prediction history. Using two bits, four prediction states are typically represented: strongly taken, weakly taken, strongly not taken, and weakly not taken. By having four representative states, the relative tendencies of branch behavior may be recorded. If a branch is almost always taken, the predicted state will gravitate toward the strongly taken state. However, if a branch is taken only slightly more often than not, the predicted state will gravitate toward the weakly taken state. Likewise, if a branch is almost always not taken, the predicted state will gravitate toward the strongly not taken state. If the branch is not taken slightly more often than it is taken, the predicted state will gravitate toward the weakly not taken state.

Also common is the use of one bit to represent branch prediction history. Using one bit, two states are typically represented: taken and not taken. Because only one bit is used, the relative tendencies of a branch are not recorded. Either a branch is predicted taken or it is predicted not taken. Consequently, the accuracy of predictions is typically poorer than that of the two bit mechanism as will be discussed below.

Tracking branch history may be used in conjunction with a variety of structures. For example, branch history tracking may be used with a branch target buffer in which the target addresses of predicted branches are kept in a high speed cache. By utilizing such a structure, delays associated with calculating branch target addresses may be reduced. Another example would be using branch history tracking with a branch target cache in which target instructions themselves are stored in a high speed cache. This method reduces delays associated with fetching the required instructions from a more remotely located storage device. Other embodiments of branch history tracking are contemplated as well.

One example of a branch prediction mechanism is a cache-line approach in which branch predictions are stored corresponding to a particular cache line of instruction bytes in an instruction cache. A cache line is a number of contiguous bytes that are treated as a unit for allocation and deallocation of storage space within a cache. When the instruction cache line is fetched, the corresponding branch predictions are also fetched. Furthermore, when the particular cache line is discarded, the corresponding branch predictions are discarded as well. The cache line is aligned in memory. A cache-line based branch prediction mechanism may be made more accurate by storing a larger number of branch predictions for each cache line. A given cache line may include multiple branch instructions, each of which is represented by a different branch prediction. Therefore, more branch predictions allocated to a cache line allows for more branch instructions to be represented and predicted by the branch prediction mechanism. A branch instruction that cannot be represented within the branch prediction mechanism is not predicted, and subsequently a "misprediction" may be detected if the branch is found to be taken. However, the complexity of the branch prediction mechanism is increased by the need to select between additional branch predictions. As used herein, a "branch prediction" is a value that may be interpreted by the branch prediction mechanism as a prediction of whether or not a branch instruction is taken or not taken. Furthermore, a branch prediction may include the target address. For cache-line based branch prediction mechanisms, a prediction of a sequential line to the cache line being fetched is a branch prediction when no branch instructions are within the instructions being fetched from the cache line.

A problem related to increasing the complexity of the branch prediction mechanism is that the increased complexity generally requires an increased amount of time to form the branch prediction. For example, selecting among multiple branch predictions may require a substantial amount of time. The offset of the fetch address identifies the first byte being fetched within the cache line: a branch prediction for a branch instruction prior to the offset should not be selected. The offset of the fetch address within the cache line may need to be compared to the offset of the branch instructions represented by the branch predictions stored for the cache line in order to determine which branch prediction to use. The branch prediction corresponding to a branch instruction subsequent to the fetch address offset and nearer to the fetch address offset than other branch instructions that are subsequent to the fetch address offset should be selected. As the number of branch predictions is increased, the complexity (and time required) for the selection logic increases. The increased time may result in the introduction of one or more "bubbles" into the instruction processing pipeline during clock cycles that instructions cannot be fetched due to a lack of a branch prediction corresponding to a previous fetch address. The bubble occupies various stages in the instruction processing pipeline during subsequent clock cycles, and no work occurs at the stage including the bubble because no instructions are included in the bubble. Performance of the microprocessor may thereby be decreased.

As mentioned above, while using more bits to record the history of a branch may increase the accuracy of predictions, the disadvantage of such a technique is the increased storage required for the additional bits increases the physical size and cost of the branch prediction storage.

SUMMARY OF THE INVENTION

The problems outlined above are in large part solved by a branch prediction unit as described herein. Advantageously, only a single branch prediction history bit is stored for each branch prediction to represent the corresponding branch prediction history. By allowing this single bit to represent the states strongly taken and weakly taken, and allowing the absence of a branch prediction to indicate a not taken branch, three distinct states for branch prediction history may be represented. Consequently, a high degree of branch prediction accuracy may be maintained while reducing the size and cost of branch prediction storage. In one embodiment, the branch prediction unit stores a set of branch selectors corresponding to each of a group of contiguous instruction bytes stored in an instruction cache. Each branch selector identifies the branch prediction to be selected if a fetch address corresponding to that branch selector is presented.

Broadly speaking, a branch prediction mechanism comprising a branch prediction storage and a control circuit configured to update a branch prediction is contemplated. The branch prediction storage is coupled to receive a fetch address, wherein the branch prediction storage is configured to store a branch prediction corresponding to the fetch address. The stored branch prediction includes a single bit to indicate the branch prediction history and whether the branch is predicted strongly taken or weakly taken.

Further, a method for performing branch prediction is contemplated. A branch prediction is stored in response to detecting a first condition. Included in the branch prediction is a single history bit to indicate the branch is strongly taken or weakly taken. The history bit is initially set to indicate the branch is weakly taken. The history bit is toggled in response to detecting a taken branch that was predicted to be taken, if the history bit currently indicates the branch is weakly taken. The history bit is toggled in response to detecting a not taken branch that was predicted to be taken, if the history bit currently indicates the branch is strongly taken. Finally, the branch prediction is removed from the storage in response to detecting a not taken branch which was predicted to be taken, if the history bit currently indicates the branch is weakly taken.

Further, a method for performing branch prediction is contemplated. A fetch address is received to a branch prediction storage and an instruction cache. A group of contiguous instruction bytes corresponding to the fetch address is fetched from the instruction cache, where the contiguous instruction bytes comprise a plurality of byte ranges. A plurality of branch selectors corresponding to the group of contiguous instruction bytes is stored, where each one of the plurality of branch selectors corresponds to a different one of the plurality of byte ranges. Each one of the plurality of branch selectors identifies a branch prediction, where the branch prediction includes a single bit to indicate that the branch is strongly taken or weakly taken. The history bit is toggled in response to detecting a taken branch which was predicted to be not taken, if the history bit is detected to be "0". The history bit is toggled in response to detecting a not taken branch which was predicted to be taken, if the history bit is detected to be "1". The branch selectors are modified to indicate the branch is predicted to be not taken, in response to detecting a not taken branch which was predicted to be taken, if the history bit is detected to be "0".

Still further, a microprocessor is contemplated comprising an instruction cache and a branch prediction unit. The instruction cache is coupled to receive a fetch address and to provide a group of contiguous instruction bytes corresponding to said fetch address. The microprocessor also includes a branch prediction unit, wherein the branch prediction unit is configured to store a branch prediction corresponding to a branch. The stored branch prediction includes a single bit to indicate the branch prediction history for the branch prediction, where the history bit indicates the branch is strongly taken or weakly taken. The branch prediction unit is configured to update the branch prediction by toggling the history bit in response to detecting a first or a second condition. The branch prediction unit is configured to update said branch prediction by removing the branch prediction in response to detecting a third condition.

Moreover, a computer system is contemplated comprising a processor and an I/O device. The processor includes an instruction cache coupled to receive a fetch address and to provide a group of contiguous instruction bytes in response to the received fetch address. The processor also includes a branch prediction unit which is configured to store a branch prediction corresponding to a branch, where the branch prediction includes a single bit to indicate the branch is strongly taken or weakly taken. The branch prediction unit is also configured to update the stored branch prediction by toggling the history bit in response to detecting a first condition. Further, the branch prediction unit is configured to update the branch prediction by removing the branch prediction in response to detecting a second condition.

BRIEF DESCRIPTION OF THE DRAWINGS

Other objects and advantages of the invention will become apparent upon reading the following detailed description and upon reference to the accompanying drawings in which:

FIG. 15 is a table illustrating one embodiment of byte ranges within a set of contiguous instruction bytes.

FIG. 18 is a third example of branch selectors for a third exemplary set of instructions.

FIG. 19 is a fourth example of branch selectors for a fourth exemplary set of instructions.

FIG. 20 is a table illustrating an exemplary branch selector encoding for one embodiment of the branch prediction unit shown in FIG. 1.

Figure 1:
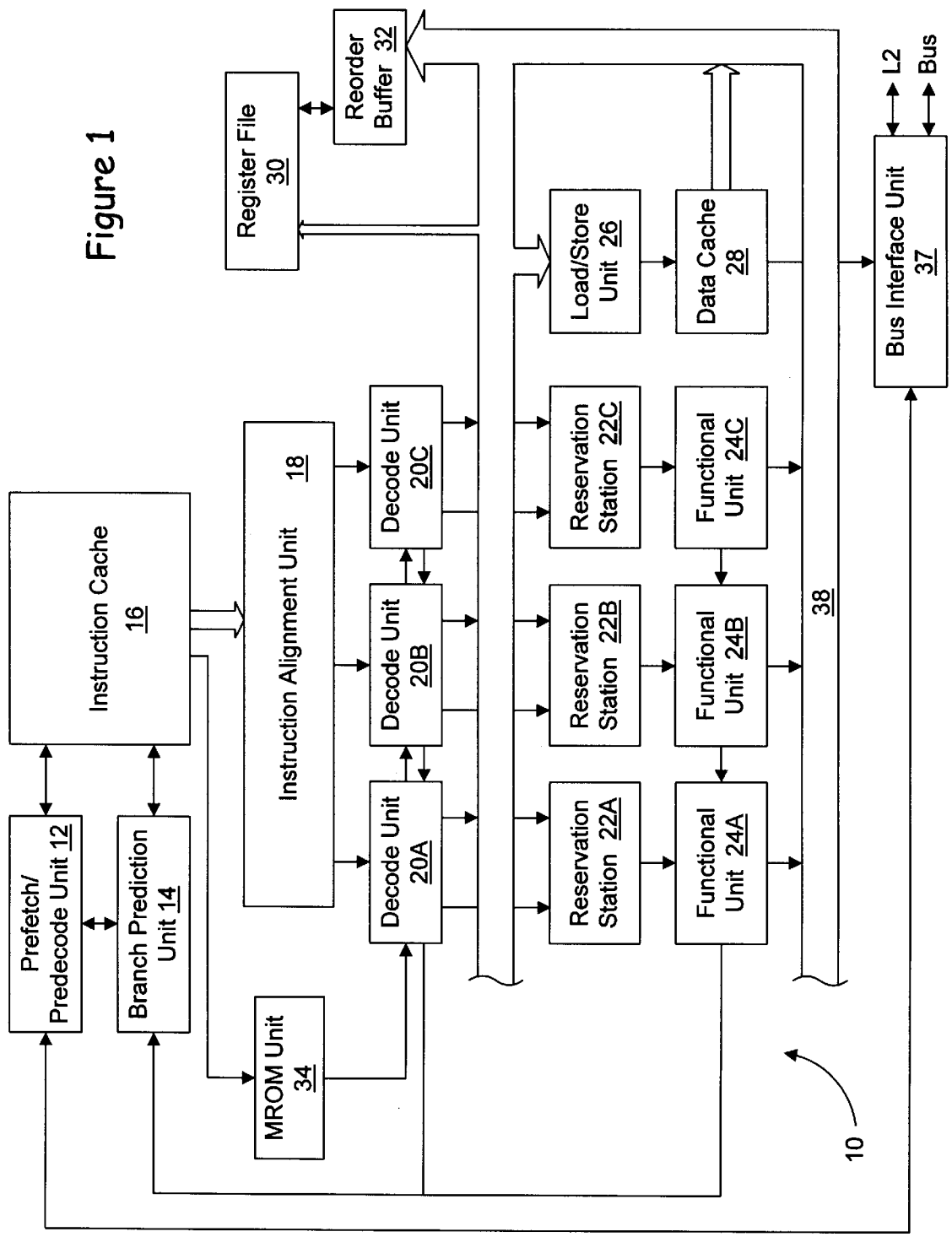
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch mechanism. A variety of prefetch mechanisms may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode mechanism.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions that may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
|---|---|
| Endbits | 00001 |
| Functional bits | 11000 |

MROM instructions are instructions that are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions that were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order).

Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations that may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions that precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 that employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction that utilizes an operand stored in memory, or may be the result of a load/store instruction that causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Figure 2:
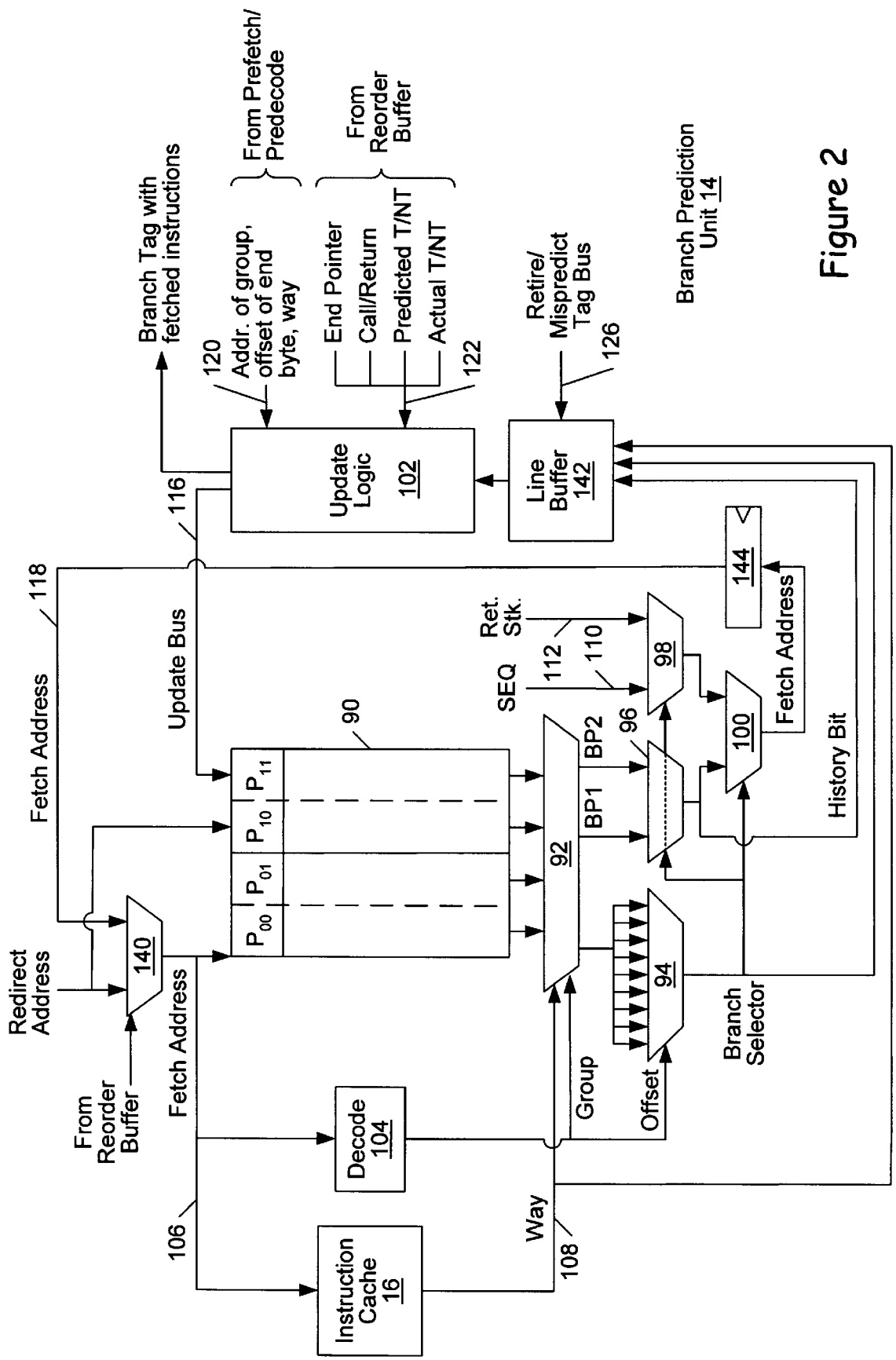
FIG. 2 is a block diagram of one embodiment of a branch prediction unit shown in FIG. 1.

Turning now to FIG. 2, a portion of one embodiment of branch prediction unit 14 is shown. Other embodiments of branch prediction unit 14 in addition to the portion shown in FIG. 2 are contemplated. As shown in FIG. 2, branch prediction unit 14 includes a branch prediction storage 90, a way multiplexor 92, a branch selector multiplexor 94, a branch prediction multiplexor 96, a sequential/return multiplexor 98, a final prediction multiplexor 100, an update logic block 102, a decoder 104, a fetch address multiplexor 140, a storage register 144, a line buffer 142, and an instruction cache 16. Branch prediction storage 90 and decoder 104 are coupled to a fetch address bus 106 from fetch address multiplexor 140. A fetch address concurrently provided to instruction cache 16 is conveyed upon fetch address bus 106. Decoder block 104 provides selection controls to branch selector multiplexor 94. Prediction controls for way multiplexor 92 are provided via a way selection bus 108 from instruction cache 16. Way selection bus 108 provides the way of instruction cache 16 which is storing the cache line corresponding to the fetch address provided on fetch address bus 106. Additionally, a selection control is provided by decoder 104 based upon which portion of the cache line is being fetched. Way multiplexor 92 is coupled to receive the contents of each storage location within the row of branch prediction storage 90 which is indexed by the fetch address upon fetch address bus 106. Branch selector multiplexor 94 and branch prediction multiplexor 96 are coupled to receive portions of the output of way multiplexor 92 as inputs. Additionally, the output of branch selector multiplexor 94 provides selection controls for multiplexors 96, 98, and 100. Sequential/return multiplexor 98 selects between a sequential address provided upon a sequential address bus 110 from instruction cache 16 and a return address provided upon a return address bus 112 from a return stack. The output of multiplexors 96 and 98 is provided to final prediction multiplexor 100, which provides a branch prediction bus 114 to storage register 144. The storage register 144 is coupled to line buffer 142 and fetch address multiplexor 140 via branch prediction fetch address bus 118. Fetch address multiplexor is also coupled to the reorder buffer 32 which provides a redirect address and control for selecting between the redirect address and the branch prediction fetch address provided via branch prediction fetch address bus 118. Instruction cache 16 uses the fetch address provided upon fetch address bus 106 as the fetch address for the subsequent clock cycle. Update logic block 102 is coupled to branch prediction storage 90 via an update bus 116 used to update branch prediction information stored therein. Update logic block 102 provides updates in response to a misprediction signaled via a prediction result bus 122 from the reorder buffer 32. Additionally, update logic block 102 provides updates in response to newly predecoded instructions indicated by prefetch/predecode unit 12 upon a predecode bus 120.

As mentioned above, update logic block 102 is configured to update a branch prediction entry upon detection of a branch misprediction or upon detection of a branch instruction while predecoding the corresponding group of contiguous instruction bytes in prefetch/predecode unit 12. The fetch address and information from the branch prediction entry corresponding to each branch prediction may be stored in line buffer 142 as the prediction is performed. A branch tag is conveyed along with the instructions being fetched (via a branch tag bus 124), such that if a misprediction is detected or a branch instruction is detected during predecoding, the corresponding branch prediction entry can be identified via the branch tag. In one embodiment, the history bit and branch selectors described below are stored, as well as the index of the fetch address which caused the branch prediction entry to be fetched and the way in which the branch prediction entry is stored.

Branch prediction updates are performed for correctly predicted branches and mispredicted branches. Upon retirement of a branch instruction or detection of a mispredicted branch, reorder buffer 32 supplies information about the branch upon prediction result bus 122. The corresponding entry in line buffer 142 is indicated via a branch tag upon retire/mispredict tag bus 126 from reorder buffer 32. Included in the information supplied upon the prediction result bus 122 is the predicted behavior for the branch, the actual behavior of the branch, whether a branch is a subroutine call or subroutine return, and the offset of the end byte of the branch instruction within the contiguous group of instruction bytes. When the prediction result bus 122 indicates a mismatch between the predicted and actual behavior of a branch, a mispredicted branch is indicated. If the branch prediction history bit corresponding to the branch instruction currently indicates strongly taken, update logic 102 updates the history bit to indicate weakly taken. If the history bit currently indicates weakly taken, update logic 102 updates the branch prediction by removing the corresponding branch prediction entry. Removal of the branch prediction entry is accomplished in one embodiment by modifying the branch selectors, as described below, to indicate the corresponding branch is predicted not taken. For the misprediction of a predicted not taken branch, an entry is created in the branch prediction storage for the branch as described below. When the prediction result bus indicates a match between the predicted behavior of a predicted taken branch and the actual behavior of the branch, a correct prediction is indicated. For the predicted taken branch, which is correctly predicted, update logic 102 updates history bit to indicate strongly taken.

According to one embodiment, the algorithm for selecting one of the branch predictions to store the branch prediction for the previously undetected branch instruction is as follows: if the branch instruction is a subroutine return instruction, the branch selector for the instruction is selected to be the value indicating the return stack. Otherwise, a branch prediction which is currently predicted not taken is selected. If each branch prediction is currently predicted-taken, then a branch prediction is randomly selected.

Figure 24:
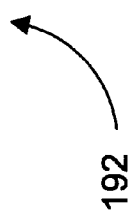
FIG. 24 is a table illustrating another embodiment of byte ranges within a set of contiguous instruction bytes.

The branch selector for the newly detected branch instruction is set to indicate the selected branch prediction. Additionally, the branch selectors corresponding to byte ranges between the first branch instruction prior to the newly detected branch instruction and the newly detected branch instruction are set to the branch selector corresponding to the new prediction. FIG. 24 below describes one method for updating the branch selectors. For a mispredicted taken prediction which causes the prediction to become predicted not-taken, the branch selectors corresponding to the mispredicted prediction are set to the branch selector corresponding to the byte subsequent to the mispredicted branch instruction. In this manner, a prediction for a subsequent branch instruction will be used if the instructions are fetched again at a later clock cycle.

When prefetch/predecode unit 12 detects a branch instruction while predecoding a group of contiguous instruction bytes, prefetch/predecode unit 12 provides the branch tag for the group of contiguous instruction bytes if the predecoding is performed because invalid predecode information is stored in the instruction cache for the cache line (case (i)). Alternatively, if the predecoding is being performed upon a cache line being fetched from the main memory subsystem, prefetch/predecode unit 12 provides the address of the group of contiguous instruction bytes being predecoded, the offset of the end byte of the branch instruction within the group, and the way of the instruction cache selected to store the group upon predecode bus 120 (case (ii)). In case (i), the update is performed similar to the branch misprediction case above. In case (ii), there is not yet a valid branch prediction entry stored in branch prediction storage 90 for the group of instructions. For this case, update logic block 102 initializes the branch selectors prior to the detected branch to the branch selector selected for the detected branch. Furthermore, the branch selectors subsequent to the detected branch are initialized to the sequential value.

Alternatively, each of the branch selectors may be initialized to sequential when the corresponding cache line in instruction cache 16 is allocated, and subsequently updated via detection of a branch instructions during predecode in a manner similar to case (i). In one embodiment, prefetch/predecode unit 12 detects only unconditional branch instructions.

Upon generation of an update, update logic block 102 conveys the updated branch prediction entry, along with the fetch address index and corresponding way, upon update bus 116 for storage in branch prediction storage 90. It is noted that, in order to maintain branch prediction storage 90 as a single ported storage, branch prediction storage 90 may employ a branch holding register. The updated prediction information is stored into the branch holding register and updated into the branch prediction storage upon an idle cycle on fetch address bus 106. The new branch target address for the updated entry, if applicable, is the redirect address provided by reorder buffer 32.

In the present embodiment, branch prediction storage 90 is arranged with a number of ways equal to the number of ways in instruction cache 16. For each way, a branch prediction entry is stored for each group of contiguous instruction bytes existing within a cache line. As used herein, the term "group of contiguous instruction bytes" is used to refer to the instruction bytes that are provided by the instruction cache in a particular clock cycle in response to a fetch address. A group of contiguous instruction bytes may be a portion of a cache line or an entire cache line, according to various embodiments, In the embodiment of FIG. 2, two groups of instruction bytes are included in each cache line. Therefore, branch prediction entry $P_{00}$ is the branch prediction entry corresponding to the first group of contiguous instruction bytes in the first way and branch prediction entry $P_{01}$ is the branch prediction entry corresponding to the second group of contiguous instruction bytes in the first way. Similarly, branch prediction entry $P_{10}$ is the branch prediction entry corresponding to the first group of contiguous instruction bytes in the second way and branch prediction entry $P_{11}$ is the branch prediction entry corresponding to the second group of contiguous instruction bytes in the second way, etc. Each branch prediction entry in the indexed row is provided as an output of branch prediction storage 90, and hence as an input to way multiplexor 92. The indexed row is similar to indexing into a cache: a number of bits which are not part of the offset portion of the fetch address are used to select one of the rows of branch prediction storage 90. It is noted that branch prediction storage 90 may be configured with fewer rows than instruction cache 16. For example, branch prediction storage 90 may include ¼ or ½ the number of rows of instruction cache 16. In such a case, the address bits which are index bits of instruction cache 16 but which are not index bits of branch prediction storage 90 may be stored with the branch prediction information and checked against the corresponding bits of the fetch address to confirm that the branch prediction information is associated with the row of instruction cache 16 which is being accessed.

Way multiplexor 92 selects one of the sets of branch prediction information $P_{00}$–$P_{11}$ based upon the way selection provided from instruction cache 16 and the group of instruction bytes referenced by the fetch address. In the embodiment shown, for example, a 64 byte cache line is divided into four 16 byte groups. Therefore, the fifth and sixth least significant bit of the fetch address is used to select which of the four groups contains the fetch address. If the fifth and sixth least significant bits are '00', then the first group of contiguous instruction bytes is selected. If the fifth and sixth least significant bits are '01', then the second group of contiguous instruction bytes is selected. If the fifth and sixth least significant bits are '10', then the third group of contiguous instruction bytes is selected. If the fifth and sixth least significant bits are '11', then the fourth group of contiguous instruction bytes is selected. It is noted that the way selection provided upon way selection bus 108 may be a way prediction produced by a branch prediction from the previous clock cycle, according to one embodiment. Alternatively, the way selection may be generated via tag comparisons between the fetch address and the address tags identifying the cache lines stored in each way of the instruction cache. It is noted that an address tag is the portion of the address that is not an offset within the cache line nor an index into the instruction cache. The selected branch prediction entry provided by way multiplexor 92 includes a set of branch selectors corresponding to the group of contiguous instruction bytes, as well as branch predictions BP1 and BP2. The branch selectors are provided to branch selector multiplexor 94, which selects one of the branch selectors based upon selection controls provided by decoder 104. Decoder 104 decodes the offset of the fetch address into the group of contiguous instruction bytes to select the corresponding branch selector (for example, according to the "read address" row of table 76 of FIG. 15 below, in one embodiment). For example, if a group of contiguous instruction bytes is 16 bytes, then decoder 104 decodes the four least significant bits of the fetch address. In this manner, a branch selector is chosen.

The selected branch selector is used to provide selection controls to branch prediction multiplexor 96, sequential/return multiplexor 98, and final prediction multiplexor 100. In one embodiment, the encoding of the branch selector can be used directly as the multiplexor select controls. In other embodiments, a logic block may be inserted between branch selector multiplexor 94 and multiplexors 96, 98, and 100. For the embodiment shown, branch selectors comprise two bits. One bit of the selected branch selector provides the selection control for prediction multiplexor 96 and sequential/return multiplexor 98. The other bit provides a selection control for final prediction multiplexor 100. A branch prediction is thereby selected from the multiple branch predictions stored in branch prediction storage 90 corresponding to the group of contiguous instruction bytes being fetched, the sequential address of the group of contiguous instruction bytes sequential to the group of contiguous instruction bytes being fetched, and a return stack address from a return stack structure. It is noted that multiplexors 96, 98, and 100 may be combined into a single 4 to 1 multiplexor for which the selected branch selector provides selection controls to select between the two branch predictions from branch prediction storage 90, the sequential address, and the return address.

The return stack structure (not shown) is used to store return addresses corresponding to subroutine call instructions previously fetched by microprocessor I0. In one embodiment, the branch predictions stored by branch prediction storage 90 include an indication that the branch prediction corresponds to a subroutine call instruction. Subroutine call instructions are a subset of branch instructions that save the address of the sequential instruction (the return address) in addition to redirecting the instruction stream to the target address of the subroutine call instruction. For example, in the x86 microprocessor architecture, the subroutine call instruction (CALL) pushes the return address onto the stack indicated by the ESP register.

A subroutine return instruction is another subset of the branch instructions. The subroutine return instruction uses the return address saved by the most recently executed subroutine call instruction as a target address. Therefore, when a branch prediction includes an indication that the branch prediction corresponds to a subroutine call instruction, the sequential address to the subroutine call instruction is placed at the top of the return stack. When a subroutine return instruction is encountered (as indicted by a particular branch selector encoding), the address nearest the top of the return stack which has not previously been used as a prediction is used as the prediction of the address.

The address nearest the top of the return stack which has not previously been used as a prediction is conveyed by the return stack upon return address bus 112. Branch prediction unit 14 informs the return stack when the return address is selected as the prediction.

The sequential address is provided by instruction cache 16. The sequential address identifies the next group of contiguous instruction bytes within main memory to the group of instruction bytes indicated by the fetch address upon fetch address bus 106.

It is noted that the structure of FIG. 2 may be further accelerated through the use of a predicted branch selector. The predicted branch selector is stored with each branch prediction entry and is set to the branch selector selected in a previous fetch of the corresponding group of contiguous instruction bytes. The predicted branch selector is used to select the branch prediction, removing branch selector multiplexor 94 from the path of branch prediction generation. Branch selector multiplexor 94 is still employed, however, to verify the selected branch selector is equal to the predicted branch selector. If the selected branch selector and the predicted branch selector are not equal, then the selected branch selector is used to provide the correct branch prediction during the succeeding clock cycle and the fetch of the incorrect branch prediction is cancelled.

Figure 3:
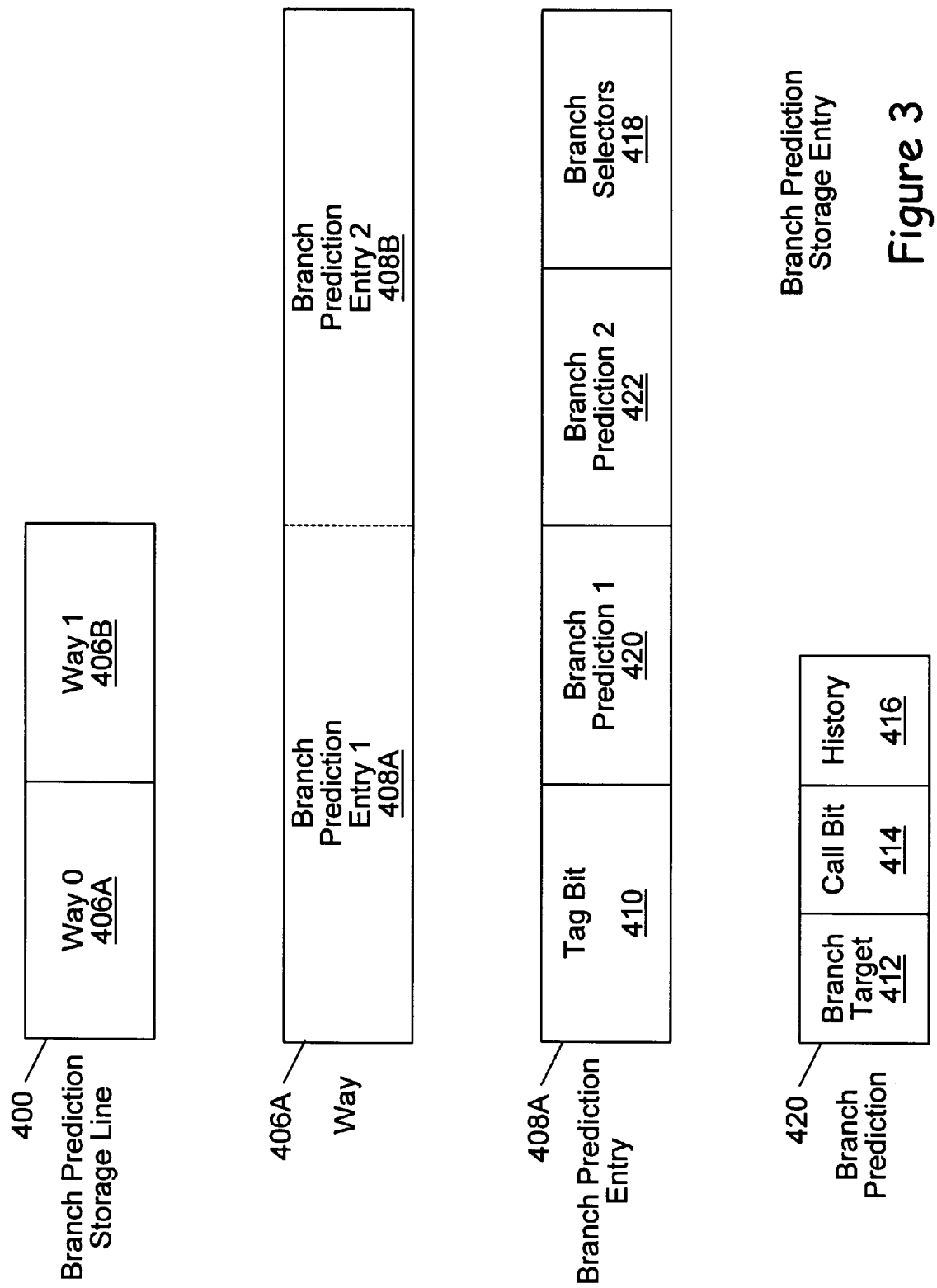
FIG. 3 is a block diagram of one embodiment of a branch prediction storage entry corresponding to a group of contiguous instruction bytes.

Turning now to FIG. 3, an exemplary branch prediction entry 404 employed by one embodiment of the branch prediction unit 14 as shown in FIG. 2 is shown. FIG. 3 illustrates a line in a branch prediction storage 400 including ways 406A–406B, way 406A including branch prediction entries 408A–408B, branch prediction entry 408A, and a branch prediction 420. Branch prediction entry 406A includes a set of branch selectors 418, a first branch prediction 420, a second branch prediction 422, and a tag bit 410. Set of branch selectors 418 includes a branch selector for each byte range of the group of contiguous instruction bytes corresponding to branch prediction entry 406A. The tag bit 410 may be used to account for a reduced number of rows in the branch target buffer as compared to the instruction cache.

Branch prediction 420 includes a branch target 412, a call bit 414, and a history bit 416. Branch target 412 is the target address of a predicted taken branch. The call bit 414 is indicative, when set, that the corresponding branch instruction is a subroutine call instruction. If call bit 148 is set, the current fetch address and way are stored into the return stack structure mentioned above. Finally, the history bit 416 represents the history of the branch corresponding to the branch prediction entry 420.

The history bit serves as the branch predictor and is a single bit which indicates a strongly or a weakly taken prediction. In one embodiment, if a strongly taken prediction is mispredicted, it becomes a weakly taken prediction. If a weakly taken prediction is mispredicted, the branch becomes predicted not taken and the branch selector is updated. In another embodiment, the absence of an entry for a branch instruction in a branch prediction storage indicates a not taken prediction. If a branch is taken and no entry exists for the branch in the branch prediction storage, an entry is created for the branch in the branch prediction storage. Other embodiments are contemplated as well.

FIGS. 4–12 illustrate the difference in branch prediction accuracy various branch history mechanisms may have. An example of sequences through a ten-iteration loop in which the end of loop branch is taken 9 times and not taken once is used. A sequence is a complete cycle of ten iterations through the loop.

Figures 4, 5, 6:
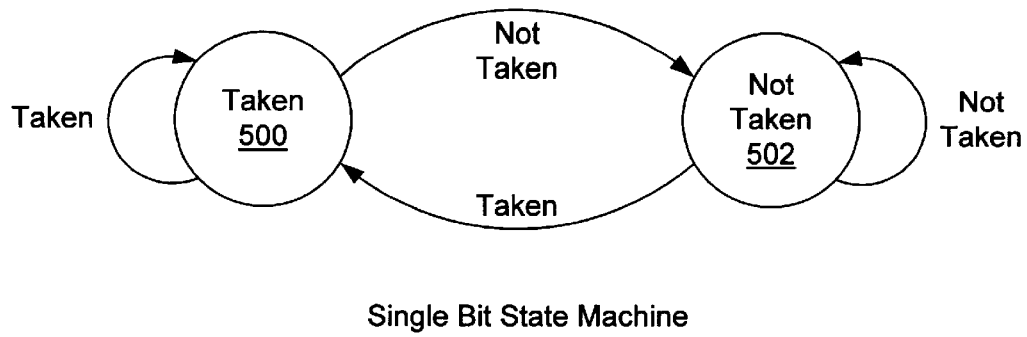
FIG. 4 is a state machine diagram representing the two states of a typical one bit branch history prediction mechanism.
FIG. 5 is a table representing the accuracy of a typical one bit branch history mechanism in the first sequence through a loop.
FIG. 6 is a table representing the accuracy of a typical one bit branch history mechanism on subsequent sequences through a loop.

FIGS. 4–6 relate to the typical one bit branch history mechanism in which one state is taken and the other is not taken. FIG. 4 is a representative state machine and FIGS. 5–6 are tables demonstrating the prediction accuracy of this mechanism in relation to the loop structure mentioned above.

Turning to FIG. 4, the two predictive states of the typical single bit branch history mechanism are shown: taken 500 and not taken 502. Arcs from each state represent the actual behavior of the predicted branches. When a branch is encountered and the current predictive state is taken 500, the resulting prediction for the branch will be a taken prediction. Conversely, if the current predictive state is not taken 502 when a branch is encountered, the resulting prediction will be not taken. If the actual behavior of the predicted branch matches that of the prediction, the next predictive state is the current state. However, if the actual behavior of the branch does not match the prediction, then the state machine transitions to the other state.

Figures 7, 8, 9:
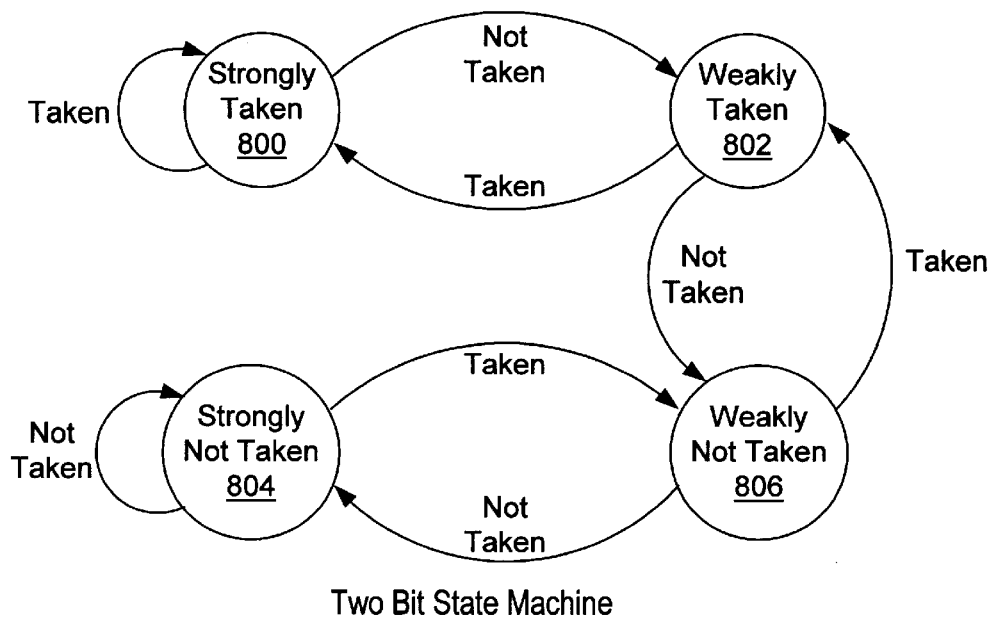
FIG. 7 is a state machine diagram representing the four states of the typical two bit branch history prediction mechanism.
FIG. 8 is a table representing the accuracy of a typical two bit branch history mechanism in the first sequence through a loop.
FIG. 9 is a table representing the accuracy of a typical two bit branch history mechanism on subsequent sequences through a loop.

FIG. 5 is a table showing the behavior of the typical one bit mechanism of FIG. 4 in the execution of the ten iteration loop described above. The first row of the table enumerates each iteration through the loop, 1–10. The left column of the table segments the table into the four remaining rows. The second row represents the current state of the branch history predictor. The third row represents the prediction made by the predictor. The fourth row represents the actual behavior of the branch and the fifth row represents the next predictive state for the branch history predictor. The entries in the table have the following meanings: T—taken, NT—not taken. Examining the table, in the first iteration through the loop the current state is not taken, the prediction is not taken, the actual behavior of the loop is taken, and the next predictive state is taken. For iterations 2–9, the current state, prediction, actual behavior, and next state are all taken. However, on the tenth iteration the current state and prediction are taken, the actual behavior is not taken, and the next state is not taken. Of the ten iterations through the loop, the predictor was correct 8 times giving an accuracy rate of 80%. As FIG. 6 shows, the behavior of the typical single bit mechanism is the same on subsequent sequences of the loop as well. Consequently, this mechanism results in an 80% accuracy rate for the loop every time. FIGS. 7–9 are examined next, which demonstrate the behavior of a branch prediction mechanism using two bits.

FIG. 7 shows the state machine for a typical two bit branch history prediction mechanism. In this mechanism, there are four current predictive states represented: strongly taken 800, weakly taken 802, weakly not taken 806, and strongly not taken 804. Arcs from each state represent the actual behavior of the predicted branch and the transitions to the next predictive state. When a branch is encountered, the predicted behavior of the branch is dictated by the current predictive state of the state machine. If the state machine is in either the strongly taken 800 or weakly taken state 802, the prediction will be taken. Conversely, if the state machine is in either the strongly not taken 804 or weakly not taken state 806, the prediction will be not taken.

FIG. 8 is a table showing the behavior of the two bit mechanism in the execution of the ten iteration loop described above. The entries in the table have the following meanings: ST—strongly taken, WT—weakly taken, WN—weakly not taken, SN—strongly not taken, T—taken, NT—not taken.

Examining each iteration of the loop in the table, it is noted that in the first iteration the current predicted state is weakly not taken and the prediction is not taken. The branch in the first iteration is in fact taken and the next predictive state is weakly taken. In the second iteration, the current predictive state is weakly taken providing a taken prediction. The branch is taken and the next predictive state is strongly taken.

Iterations 3–9 all have current predictive states of strongly taken, taken predictions, taken branches, and strongly taken next predictive states. In the tenth iteration, the current predictive state is strongly taken giving the taken prediction. However, the branch is not taken and the next predictive state is weakly taken. Based on this first sequence through the ten iteration loop, we see an 80% accuracy rate in predicting the behavior of the branch.

FIG. 9 illustrates the same two bit mechanism on subsequent sequences through the same loop. In the first iteration of the subsequent sequence, the current predicted state is weakly taken resulting in a taken prediction. The branch is taken and the next predicted state becomes strongly taken. For iterations 2–9, the current state is strongly taken, the branches are correctly predicted as taken, and the next predicted state is strongly taken. On the final iteration, the branch is not taken and the next predicted state becomes weakly taken. Consequently, for this and subsequent sequences, this mechanism achieves a 90% accuracy rate. By using an additional bit to record branch history, more states may be represented and the mechanism is better able to account for the relative tendencies of a particular branch. Because of this the two bit mechanism has improved the prediction accuracy on subsequent sequences to 90% from the 80% accuracy of the single bit mechanism, albeit at the cost of doubling the number of bits used to record the history.

Figures 10, 11, 12:
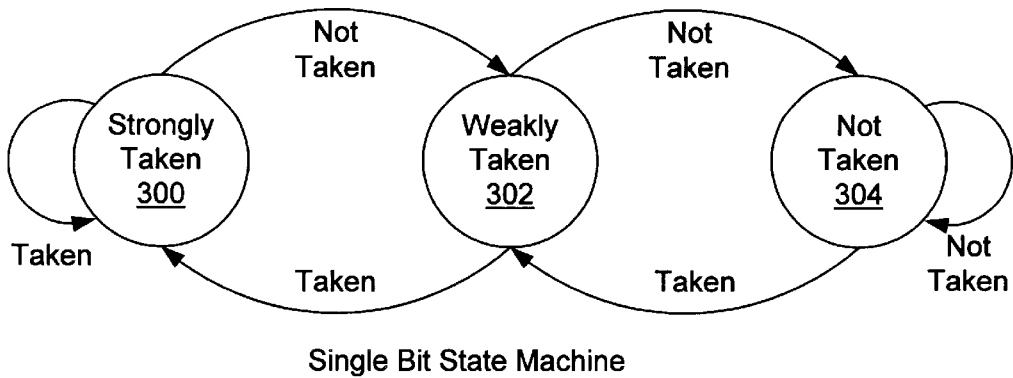
FIG. 10 is a state machine diagram representing one embodiment of the three states of a branch history prediction mechanism.
FIG. 11 is a table representing the accuracy of one embodiment of a one bit branch history mechanism in the first sequence through a loop.
FIG. 12 is a table representing the accuracy of one embodiment of a one bit branch history mechanism on subsequent sequences through a loop.

FIGS. 10–12 show the behavior of one embodiment of the branch prediction mechanism. In FIG. 10 the three states of the branch prediction mechanism shown in FIG. 2 are illustrated, as well as the transitions among them. FIG. 10 shows a strongly taken state 300, a weakly taken state 302, and a not taken state 304. The states represent the predicted behavior for a branch and the transitions indicate the actual behavior of the predicted branch. For example, when a branch is predicted strongly taken 300 and is actually taken, the next prediction for the branch will be strongly taken 300. If the branch was actually not taken, the next prediction would be weakly taken 302. When a branch is predicted weakly taken 302 and the branch is actually taken, the next prediction for the branch will be strongly taken. However, if the branch is actually not taken, the prediction for that branch will be removed from the branch prediction storage and the next prediction for that branch will be not taken 304. Finally, when a branch is predicted not taken 304 and is actually not taken, the next prediction will be not taken. But if the branch is actually taken, an entry will be created for the branch in the branch prediction storage and the next prediction for the branch will be weakly taken 302. By using the single history bit to indicate the relative strengths of taken predictions, branch prediction accuracy is improved while reducing the number of bits needed to achieve that accuracy as will be shown in the discussion of FIGS. 11 and 12.

For the entries of the tables in FIGS. 11 and 12, the symbols used therein have the following meanings: ST—strongly taken, WT—weakly taken, T—taken, and NT—not taken.

First examining FIG. 11, there is shown in the first iteration through the loop a current state of not taken, a prediction of not taken, an actual behavior of taken, and a next state of weakly taken. The second iteration has a current state of weakly taken, a taken prediction, an actual behavior of taken, and a next state of strongly taken. In iterations 3–9 we have strongly taken current states, taken predictions, actually taken branches, and next states of strongly taken. Finally, in the tenth iteration, we have a current state of strongly taken, a taken prediction, a not taken branch, and a next state of weakly taken. Thus, the first sequence through the loop made accurate predictions 8 out of 10 times demonstrating a prediction accuracy rate of 80%.

Now in FIG. 12, we have a table demonstrating the behavior of the branch prediction mechanism on subsequent sequences through the loop. Upon encountering the branch again, the currect state is weakly taken. The first prediction for the branch is taken, the actual behavior is taken and the next state is strongly taken. Iterations 2–9 show strongly taken current states, taken predictions, taken branches, and strongly taken next states. The final iteration shows a taken prediction for a not taken branch and a weakly taken next state. Using this mechanism, a 90% prediction accuracy is achieved on subsequent branches in spite of the fact that only a single bit is used. This contrasts with the typical one bit mechanism, which achieves only an 80% accuracy. In this case, the accuracy of the two bit mechanism is achieved. Turning now to FIGS. 13–21, additional details regarding one embodiment of branch selectors are provided.

Figure 13:
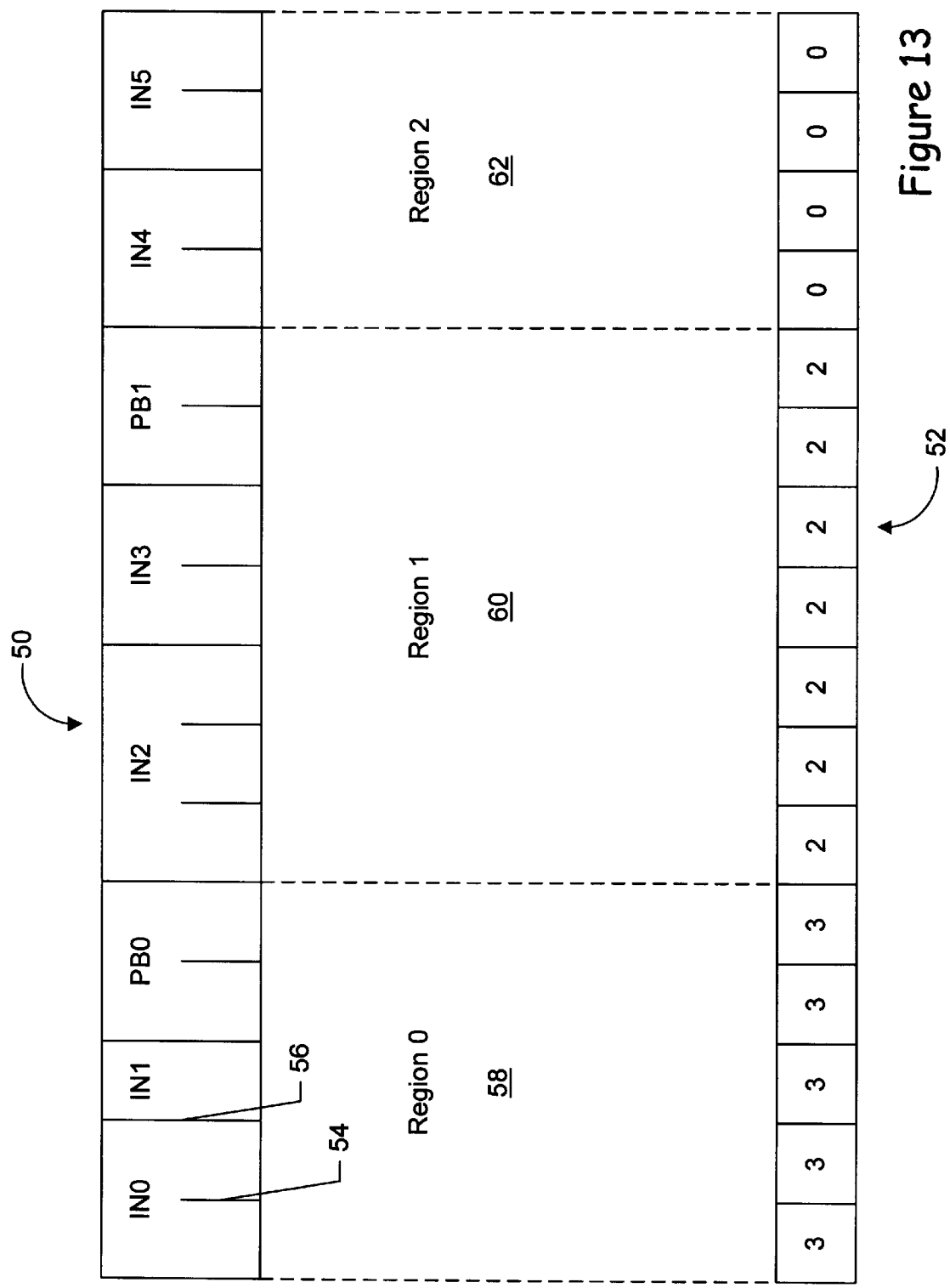
FIG. 13 is a block diagram of a group of contiguous instruction bytes and a corresponding set of branch selectors, according to one embodiment of a branch prediction mechanism for the microprocessor shown in FIG. 1.

Turning now to FIG. 13, a diagram of an exemplary group of contiguous instruction bytes 50 and a corresponding set of branch selectors 52 are shown. In FIG. 13, each byte within an instruction is illustrated by a short vertical line (e.g. reference number 54). Additionally, the vertical lines separating instructions in group 50 delimit bytes (e.g. reference number 56). The instructions shown in FIG. 13 are variable in length, and therefore the instruction set including the instructions shown in FIG. 13 is a variable byte length instruction set. In other words, a first instruction within the variable byte length instruction set may occupy a first number of bytes which is different than a second number of bytes occupied by a second instruction within the instruction set. Other instruction sets may be fixed-length, such that each instruction within the instruction set occupies the same number of bytes as each other instruction.

As illustrated in FIG. 13, group 50 includes non-branch instructions IN0–IN5. Instructions IN0, IN3, IN4, and IN5 are two byte instructions. Instruction IN1 is a one byte instruction and instruction IN2 is a three byte instruction. Two predicted-taken branch instructions PB0 and PB1 are illustrated as well, each shown as occupying two bytes. It is noted that both non-branch and branch instructions may occupy various numbers of bytes.

The end byte of each predicted-taken branch PB0 and PB1 provides a division of group 50 into three regions: a first region 58, a second region 60, and a third region 62. If a fetch address identifying group 50 is presented, and the offset of the fetch address within the group identifies a byte position within first region 58, then the first predicted-taken branch instruction to be encountered is PB0 and therefore the branch prediction for PB0 is selected by the branch prediction mechanism. Similarly, if the offset of the fetch address identifies a byte within second region 60, the appropriate branch prediction is the branch prediction for PB1. Finally, if the offset of the fetch address identifies a byte within third region 62, then there is no predicted-taken branch instruction within the group of instruction bytes and subsequent to the identified byte. Therefore, the branch prediction for third region 62 is sequential. The sequential address identifies the group of instruction bytes which immediately follows group 50 within main memory.

As used herein, the offset of an address comprises a number of least significant bits of the address. The number is sufficient to provide different encodings of the bits for each byte within the group of bytes to which the offset relates. For example, group 50 is 16 bytes. Therefore, four least significant bits of an address within the group form the offset of the address. The remaining bits of the address identify group 50 from other groups of contiguous instruction bytes within the main memory. Additionally, a number of least significant bits of the remaining bits form an index used by instruction cache 16 to select a row of storage locations which are eligible for storing group 50.

Set 52 is an exemplary set of branch selectors for group 50. One branch selector is included for each byte within group 50. The branch selectors within set 52 use the encoding shown in FIG. 20 below. In the example, the branch prediction for PB0 is stored as the second of two branch predictions associated with group 50 (as indicated by a branch selector value of "3"). Therefore, the branch selector for each byte within first region 58 is set to "3". Similarly, the branch prediction for PB1 is stored as the first of the branch predictions (as indicated by a branch selector value of "2"). Therefore, the branch selector for each byte within second region 60 is set to "2". Finally, the sequential branch prediction is indicated by the branch selectors for bytes within third region 62 by a branch selector encoding of "0".

It is noted that, due to the variable byte length nature of the x86 instruction set, a branch instruction may begin within one group of contiguous instruction bytes and end within a second group of contiguous instruction bytes. In such a case, the branch prediction for the branch instruction is stored with the second group of contiguous instruction bytes. Among other things, the bytes of the branch instruction that are stored within the second group of contiguous instruction bytes need to be fetched and dispatched. Forming the branch prediction in the first group of contiguous instruction bytes would cause the bytes of the branch instruction which lie within the second group of instruction bytes not to be fetched.

Employing a set of branch selectors such as set 52 allows for a rapid determination of the predicted fetch address (i.e. by decoding the offset portion of the fetch address and selecting the corresponding selector from set 52). However, a large number of branch selectors are stored (i.e. one for each byte). The amount of branch prediction storage employed for storing the branch selectors would correspondingly be large. Still further, a relatively wide selection device (such as a multiplexor) would be needed to select the branch selector in response to the offset of the fetch address. The wider the selection device, in general, the greater the delay in propagating the selected value through the selection device (e.g. the selected branch selector).

FIG. 13 illustrates that the branch selector for each byte within a region is the same, and regions are delimited by branch instructions (more particularly, predicted-taken branch instructions). Branch instructions would generally include at least an opcode (identifying the branch instruction within the instruction set employed by microprocessor 10) and a displacement to be added to the address of the branch instruction (or the address of the instruction immediately following the branch instruction) to form the branch target address. Therefore, a branch instruction occupies at least two bytes. By taking advantage of this fact, the number of branch selectors stored with respect to a group of contiguous instruction bytes may be reduced.

For the remainder of this description, the x86 microprocessor architecture will be used as an example. However, the branch selector technique described herein may be employed within any microprocessor architecture, and such embodiments are contemplated. It is noted that, in the x86 microprocessor architecture, a subroutine return instruction is defined (e.g. the RET instruction). The subroutine return instruction specifies that its branch target address is drawn from the top of the stack indicated by the ESP register. Therefore, the RET instruction is a single byte (i.e. an opcode byte). Handling of the single byte RET instruction with branch selectors taking advantage of the at least two byte per branch instruction general rule is illustrated in more detail below.

Figure 14:
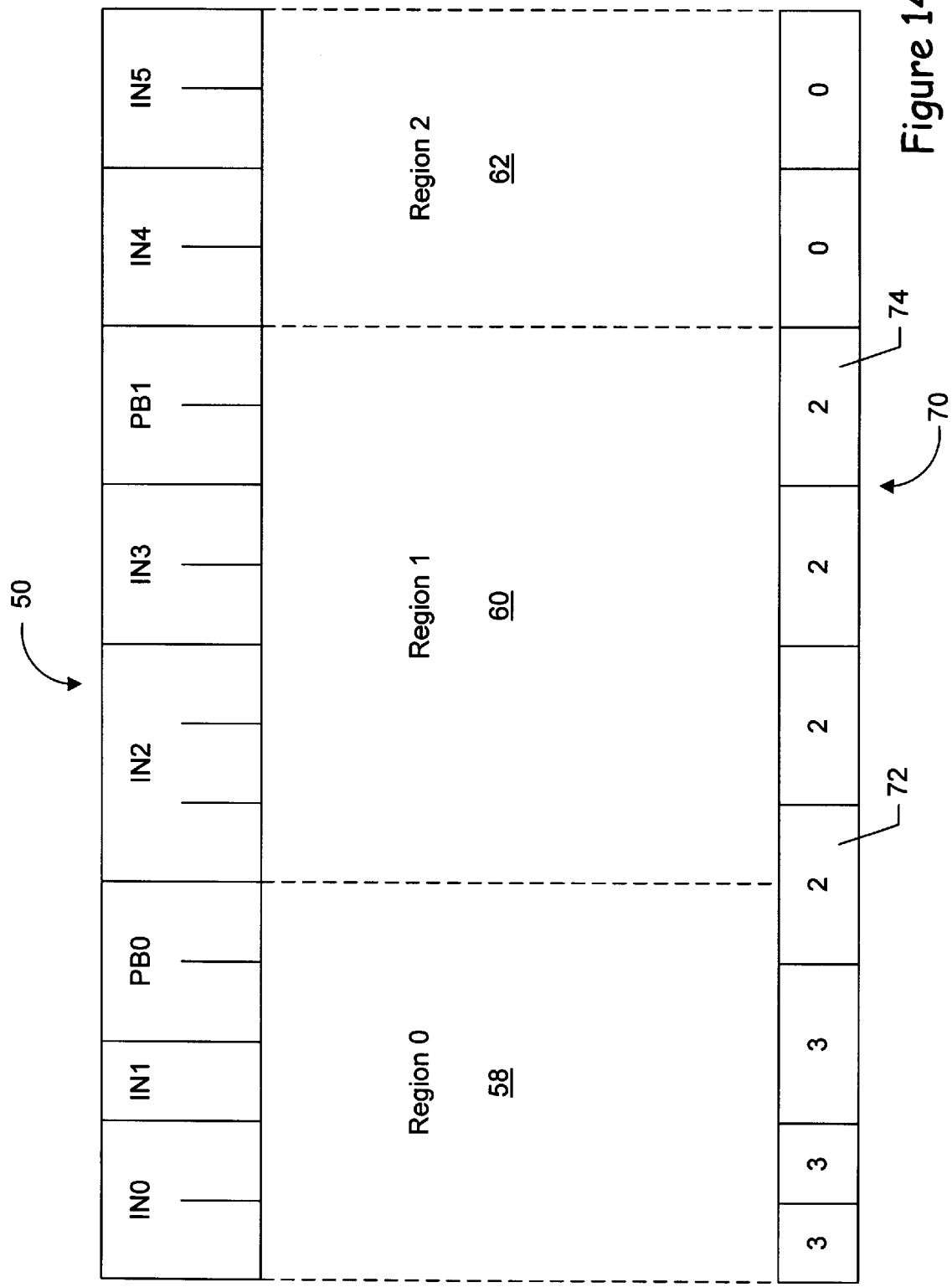
FIG. 14 is a block diagram of a group of contiguous instruction bytes and a corresponding set of branch selectors, according to another embodiment of a branch prediction mechanism for the microprocessor shown in FIG. 1.

Turning next to FIG. 14, a diagram illustrating group 50, regions 58, 60, and 62, and one embodiment of a set of branch selectors 70 is illustrated. The branch selectors within set 70 correspond to byte ranges defined within group 50. For the example shown in FIG. 14, nine branch selectors are used for a group of 16 contiguous instruction bytes. Set 70 therefore occupies less storage within a branch prediction storage than set 52 shown in FIG. 13 occupies, allowing the branch prediction storage to be made smaller. Still further, a narrower selection device may be used to select a branch selector in response to a fetch address. The selected branch selector may be provided more rapidly, and may thereby provide for a higher frequency implementation in which predicted fetch addresses are provided each clock cycle.

Generally, the largest byte range defined for a given branch selector may be made equal to the shortest branch instruction (excluding the return instruction as described in more detail below). The majority of the byte ranges are selected to be the largest size. However, to handle certain conditions, the embodiment shown in FIG. 14 employs two byte ranges that are smaller than the maximum size. In particular, the initial byte of the group 50 forms a byte range having a single byte (as explained in more detail below with respect to FIG. 16). Since group 50 is an even number of bytes, the byte range corresponding to the initial byte includes only the initial byte, and the largest byte range is two bytes in this example, another byte range is defined to have a single byte as well. For set 70, the byte within group 50 that is contiguous to the initial byte is selected to be a single byte range. This selection allows for a relatively simple decode of the offset of the fetch address to select a branch selector, as illustrated in FIG. 15.

Since the byte ranges are selected to be no larger than the shortest branch instruction, a branch instruction may begin in one byte range and end in a subsequent byte range. However, at most one branch instruction ends in a particular byte range, even if branch instructions are consecutive within a particular group of contiguous instruction bytes. For the case of a branch instruction that ends within a particular byte range but not at the end of the byte range, the branch selector for that byte range is selected to be the branch selector corresponding to instruction bytes subsequent to the branch instruction. For example, the branch selector for byte range 72 (which includes bytes 3–4, where the initial byte is numbered byte 0) indicates the branch prediction corresponding to predicted branch PB1. The above rule is used because a fetch address within the byte range is not fetching the branch instruction (which begins in the preceding byte range). Therefore, the correct branch prediction is the prediction for the subsequent branch.

On the other hand, if the branch instruction ends at the last byte within the byte range, the branch selector for the byte range is the branch selector corresponding to the branch instruction (e.g. byte range 74). Therefore, if a fetch address specifying predicted branch PB1 (i.e. the offset is within byte range 74), then the branch prediction used for the fetch is the branch prediction corresponding to branch PB1.

Turning now to FIG. 15, a table 76 is shown corresponding to the selection of byte ranges for branch selectors as illustrated in the example of FIG. 14. The row of table 76 labeled "Byte Position" lists the byte positions within group 50 that correspond to each byte range (i.e. the offset portion of the address for each byte which is within each byte range). The row labeled "Branch Selector Position" illustrates the branch selector position within the set 70 of the branch selector corresponding to each byte range. The row labeled "Read Addresses" lists the fetch address offsets (in binary) which are decoded to select the branch selector within the corresponding byte range (in order to form a predicted fetch address for the subsequent clock cycle). An "x" in the read addresses indicates a don't care position. Finally, the row labeled "Encoding Addresses" lists the fetch address offsets (in binary) at which a branch instruction can end and still have the branch selector for that byte range indicate the branch prediction corresponding to that branch instruction. For example, branch selector position 2 can indicate the branch prediction for a branch instruction that ends at either byte position 3 or 4. More particularly, a branch instruction which ends at byte position 2 is not represented by the branch selector in branch selector position 2 (because the branch instruction begins in a different byte range than that associated with branch selector position 2, and is therefore not being fetched if the fetch address offset is within the byte range associated with branch selector position 2).

The "Read Addresses" row of table 76 illustrates that a relatively simple decoding of the fetch address offset can be used to select the appropriate branch selector for that fetch address. The decoding for branch selector positions 0 and 1 include each of the fetch address offset bits, but the decoding for the remaining positions may exclude the least significant bit (since it is a don't care). A rapid decode and branch selector selection may be achieved using the allocation of byte ranges illustrated in FIG. 14.

Figure 16:
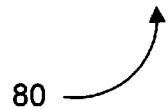
FIG. 16 is a first example of branch selectors for a first exemplary set of instructions.

Turning now to FIG. 16, a first example 80 of branch selectors for the byte ranges shown in FIGS. 14 and 15 is shown. Example 80 illustrates the use of the byte range including only byte 0 of a group of contiguous instruction bytes. Example 80 shows an instruction IN0 ending at byte "E" of a first group of contiguous instruction bytes, a predicted branch PB0 extended from byte "F" of the first group to byte 0 of a second group of contiguous instruction bytes which are sequential to the first group, and an instruction IN1 beginning at byte "1" of the second group.

Since branch instruction PB0 does not end until byte 0 of the second group, the second group needs to be fetched from instruction cache 16. Therefore, the branch selector corresponding to bytes "E" and "F" of the first group indicates sequential, thereby causing the second group to be fetched. The sequential fetch address includes an offset portion set to zero (since bytes immediately subsequent to the last bytes of the first group are being fetched). Therefore, the branch selector corresponding to byte "0" of the second group is selected. The branch selector is coded to select the branch prediction corresponding to branch instruction PB0.

If a bytes 0 and 1 of the second group formed a byte range similar to the other byte ranges shown in FIGS. 14 and 15, branch instruction PB0 would not be predictable. To allow for predictions of branches which extend across groups of instruction bytes, the byte ranges are defined to include a byte range consisting of byte "0" in the present embodiment.

Figure 17:
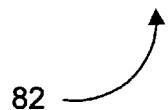
FIG. 17 is a second example of branch selectors for a second exemplary set of instructions.

Turning now to FIG. 17, a second example 82 of branch selectors for the byte ranges shown in FIGS. 14 and 15 is shown. Example 82 illustrates a situation in which a predicted branch instruction PB0 is followed by a return instruction RET. Branch instruction PB0 ends at byte "4", which is within the byte range corresponding to branch selector position 3 (i.e. byte "4" is not the last byte in the byte range). Therefore, the branch selector at branch selector position 3 does not select the branch prediction for PB0, as noted above regarding a branch instruction which ends within a byte range. The RET instruction does end at the last byte of the byte range. Therefore, the branch selector for branch selector position 3 indicates the return instruction (i.e. an encoding of "1" in example 82).

On the other hand, FIG. 18 illustrates an example 84 in which a return instruction is not predicted. Example 84 includes a predicted branch instruction PB0, a return instruction RET, and an instruction IN1. Branch instruction PB0 ends at the last byte of the byte range corresponding to branch selector position 2, and therefore the corresponding branch selector is encoded to select the branch prediction corresponding to branch instruction PB0. The return instruction ends within the byte range corresponding to branch selector position 3, and therefore the corresponding branch selector does not indicate the return instruction. In this manner, if instruction IN0 is indicated by the fetch address, the return instruction will not be erroneously predicted by the branch selector at branch selector position 3. However, if the return instruction is the byte indicated by the fetch address, an incorrect prediction results.

It is noted that the code sequence shown in example 84 may be uncommon, because often times temporary variables are popped from the stack just prior to executing a return instruction. Therefore, a predicted taken branch would not often immediately precede a return instruction.

FIG. 19 illustrates an example 86 of in which a return instruction may be mispredicted. In example 86, a return instruction is followed immediately by a predicted branch instruction PB0. This code sequence may again be infrequent, since the only way to execute branch instruction PB0 is to branch directly to the instruction from elsewhere in the code sequence. Also, the return instruction is only mispredicted in example 86 if branched to directly. If instruction IN0 is fetched and executed, the return instruction is correctly predicted.

Turning next to FIG. 20, a table 138 illustrating an exemplary branch selector encoding is shown. A binary encoding is listed (most significant bit first), followed by the branch prediction which is selected when the branch selector is encoded with the corresponding value. As table 138 illustrates, the least significant bit of the branch selector can be used as a selection control for branch prediction multiplexor 96 and sequential/return multiplexor 98. If the least significant bit is clear, then the first branch prediction is selected by branch prediction multiplexor 96 and the sequential address is selected by sequential/return multiplexor 98. On the other hand, the second branch prediction is selected by branch prediction multiplexor 96 and the return address is selected by sequential/return multiplexor 98 if the least significant bit is clear. Furthermore, the most significant bit of the branch selector can be used as a selection control for final prediction multiplexor 100. If the most significant bit is set, the output of branch prediction multiplexor 96 is selected. If the most significant bit is clear, the output of sequential/return multiplexor 98 is selected.

Figure 21:
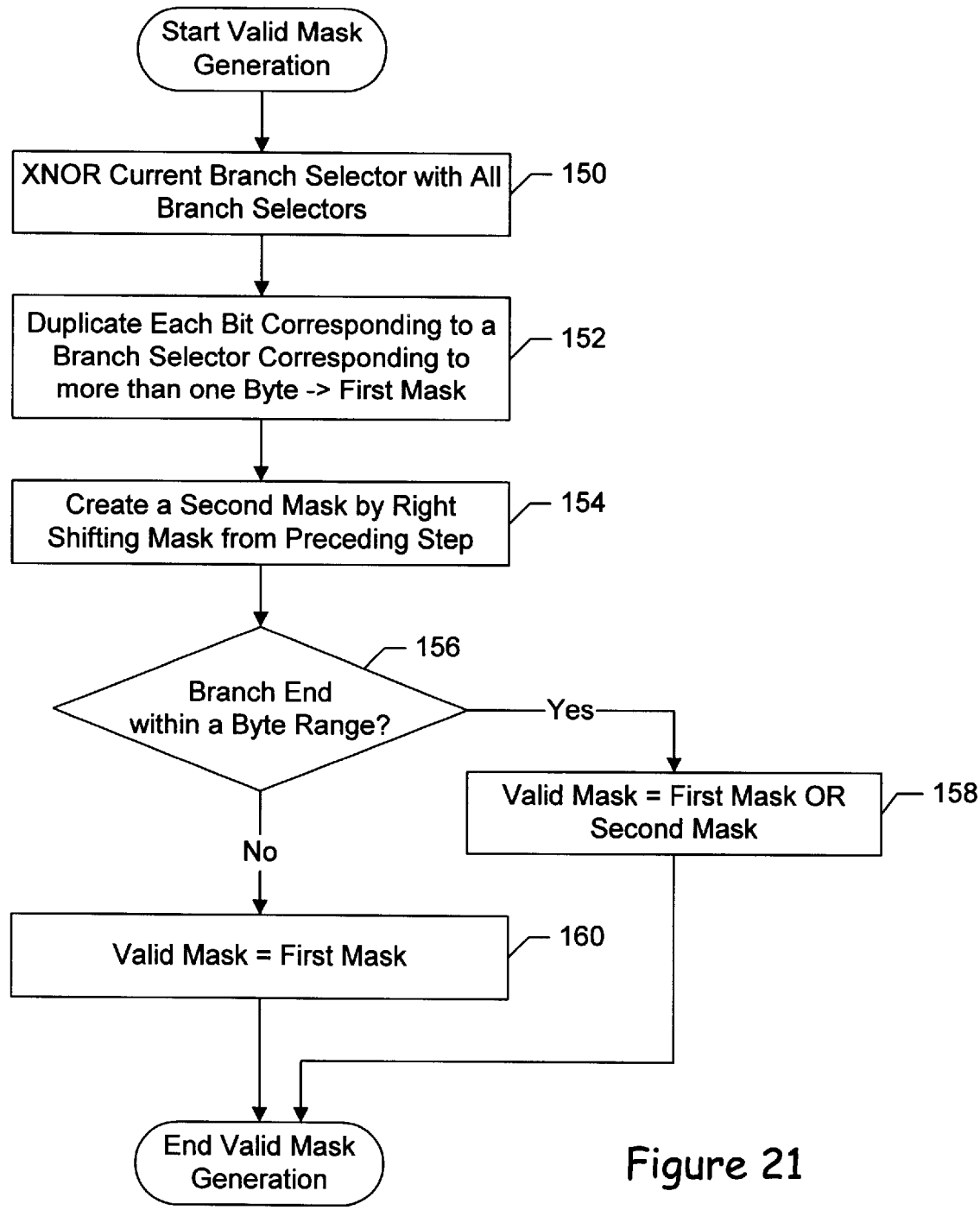
FIG. 21 is a flowchart illustrating mask generation according to one embodiment of the microprocessor shown in FIG. 1.

Turning next to FIG. 21, a flowchart is shown illustrating the generation of a valid mask for a group of contiguous instruction bytes fetched from instruction cache 16 according to the byte ranges defined in FIGS. 14 and 15. The valid mask includes a bit for each instruction byte within the group, indicating whether or not the byte is part of the predicted instruction stream. Valid bits within the mask are set between the byte selected by the offset portion of the fetch address and the branch instruction being predicted by the selected branch prediction. Those bytes comprise the instructions being fetched from the group of contiguous instruction bytes read from instruction cache 16. Bytes prior to the offset of the fetch address are not being fetched, and bytes subsequent to the predicted taken branch instruction are not being fetched either. The end of the branch instruction is approximately located by the last instance of the corresponding branch selector. However, an adjustment may be made to cover the last byte of the branch instruction in cases in which the branch instruction ends within a byte range.

The current branch selector (i.e. the branch selector selected by branch prediction unit 14 by decoding the fetch address) is XNOR'd with the branch selectors corresponding to the group of contiguous instruction bytes (step 150), thereby creating a preliminary mask including one bit per byte range. Each byte range corresponding to a branch selector equal to the current branch selector is represented by a set bit in the preliminary mask, and byte ranges including different branch selectors than the current branch selector are represented by a clear bit within the preliminary mask. A first mask is created from the preliminary mask by duplicating each bit in the preliminary mask that corresponds to a byte range having more than one byte (i.e. two bytes in the present embodiment—step 152). Generally, the bit is copied until the total number of bits representing the byte range is equal to the number of bytes within that byte range. Additionally, a second mask is created by right shifting the first mask (step 154).

If the predicted taken branch instruction ends within a byte range (as opposed to the end of the byte range), then the valid mask is created by ORing the first mask and the second mask (decision block 156 and step 158). In this manner, bytes within the byte range in which the branch instruction ends that are part of the branch instruction are validated. On the other hand, if the branch instruction ends at the end of a byte range then the branch selector for that byte range indicates the branch instruction. In this case, the first mask is correct without modification using the second mask. Therefore, the first mask is selected as the valid mask (step 160).

Figure 22:
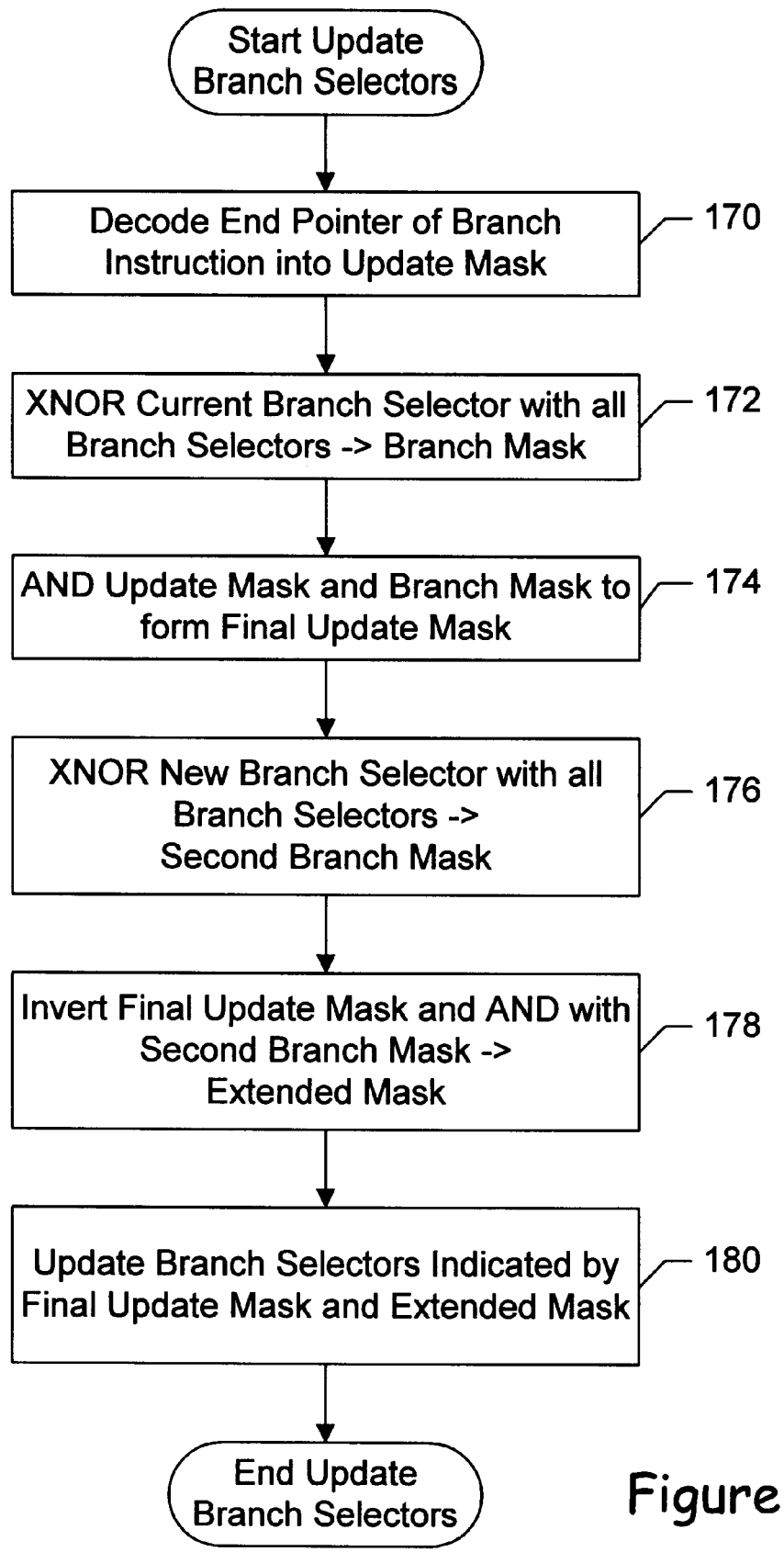
FIG. 22 is a flowchart illustrating one embodiment of branch selector update.

Turning now to FIG. 22, a flowchart depicting the steps employed to update the branch selectors of a group of contiguous instruction bytes in response to a mispredicted branch instruction is shown. Updating due to a branch instruction discovered during predecoding may be performed similarly. The misprediction may be the result of detecting a branch instruction for which prediction information is not stored in branch prediction storage 90, or may be the result of an incorrect taken/not-taken prediction which causes the corresponding predictor to indicate not-taken.

Upon detection of the misprediction, branch prediction unit 14 uses an "end pointer": the offset of the end byte of the mispredicted branch instruction within the corresponding group of contiguous instruction bytes. Additionally, the branch prediction entry is selected for update using the branch tag received in response to the misprediction.

Branch prediction unit 14 decodes the end pointer into an update mask (step 170). The update mask comprises a bit for each byte range within the group of contiguous instruction bytes. Bits corresponding to byte ranges prior to the byte range including the branch instruction's end byte are set (and the bit corresponding to the byte range including the branch instruction's end byte is set if the end byte is the last byte within the byte range), and the remaining bits are clear. Therefore, the update mask identifies each byte range prior to and including the branch instruction.

Branch prediction unit 14 identifies the current branch selector. For mispredicted taken/not-taken predictions, the current branch selector is the branch selector corresponding to the mispredicted branch instruction. For misprediction due to an undetected branch, the current branch selector is the branch selector corresponding to the byte range including the end byte of the undetected branch instruction. The current branch selector is XNOR'd with each of the branch selectors to create a branch mask (step 172). The branch mask includes bits which are set for each byte range having a branch selector which matches the current branch selector and bits which are clear for each byte range having a branch selector which does not match the current branch selector.

The update mask created in step 170 and the branch mask created in step 172 are subsequently ANDed, producing a final update mask (step 174). The final update mask includes bits that are set for each byte range of the group of contiguous instruction bytes which is to be updated to the new branch selector. For a mispredicted taken branch, the new branch selector is the branch selector of the byte range subsequent to the mispredicted taken branch instruction. For an undetected branch, the new branch selector is the branch selector indicating the branch prediction storage assigned to the previously undetected branch by update logic block 102.

An extended mask is also generated (steps 176 and 178). The extended mask indicates which branch selectors are to be erased because the branch prediction corresponding to the branch selector has been reallocated to the newly discovered branch instruction or because the branch prediction now indicates not taken. The extended mask is generated by first creating a second branch mask similar to the branch mask, except using the new branch selector instead of the current branch selector (i.e. the mask is created by XNORing the branch selectors corresponding to the group of contiguous instruction bytes with the new branch selector (step 176)). The resulting mask is then ANDed with the inversion of the final update mask to create the extended mask (step 178). Branch selectors corresponding to bits in the extended mask which are set are updated to indicate the branch selector of the byte range immediately subsequent to the last byte range for which a bit in the extended mask is set. In this manner, the branch prediction formerly indicated by the branch selector is erased and replaced with the following branch selector. During a step 180, the branch selectors are updated in response to the final update mask and the extended mask.

Figure 23:
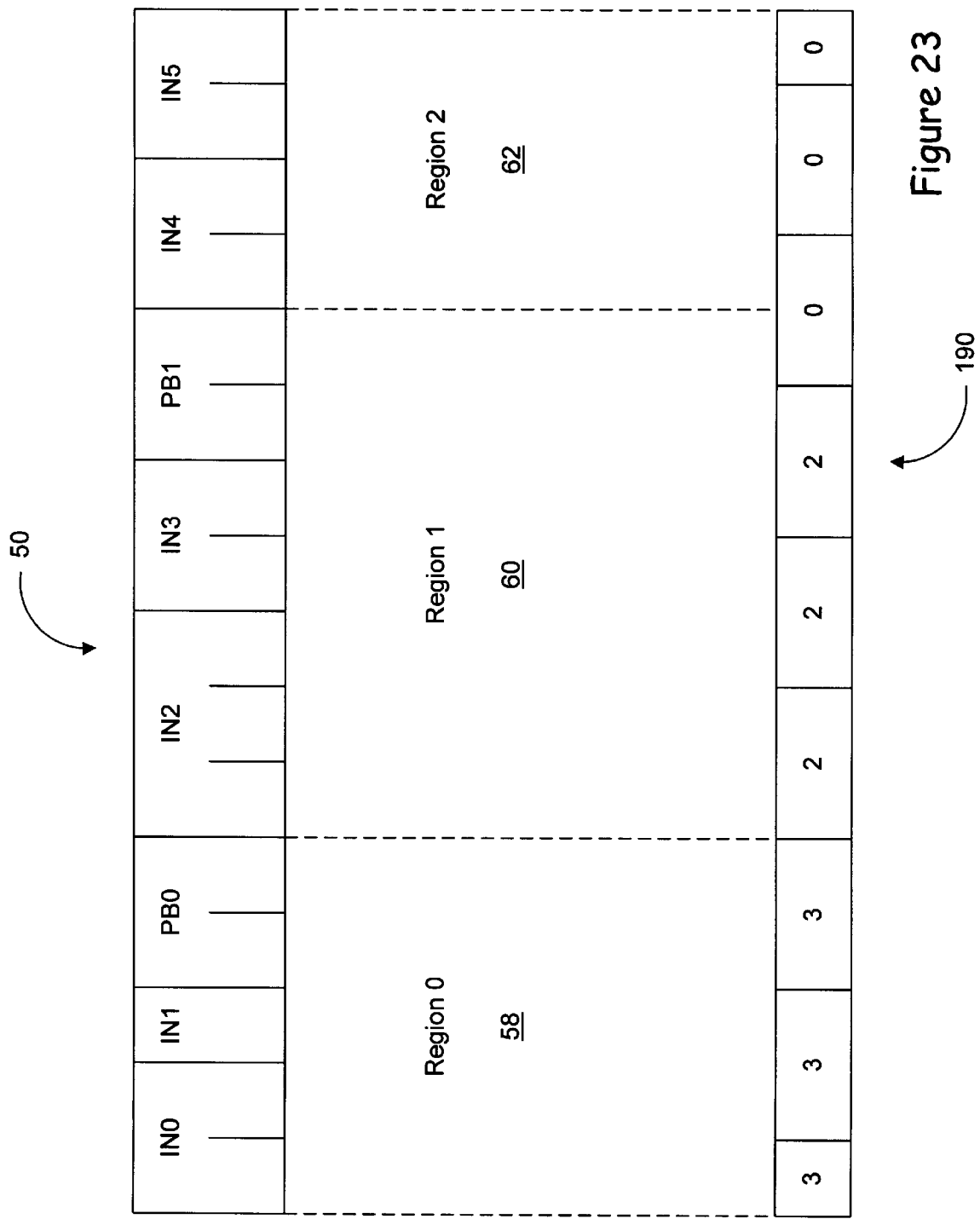
FIG. 23 is a block diagram of a group of contiguous instruction bytes and a corresponding set of branch selectors, according to yet another embodiment of a branch prediction mechanism for the microprocessor shown in FIG. 1.

Turning next to FIG. 23, a diagram illustrating instruction bytes 50, regions 58, 60, and 62, and another embodiment of a set of branch selectors 190 is illustrated. Set 190 corresponds to a set of byte ranges in which the initial byte range and final byte range each include a single byte, and other ranges include two bytes. Set 190 may be used as an alternative byte range allocation to the byte ranges allocated in FIG. 14. Many other byte range allocations are possible and contemplated in various embodiments. FIG. 24 is a table 192 similar to table 76. Table 192 illustrates byte positions, branch selector positions, read addresses and encoding addresses for the byte ranges illustrated in figure 23.

Figure 25:
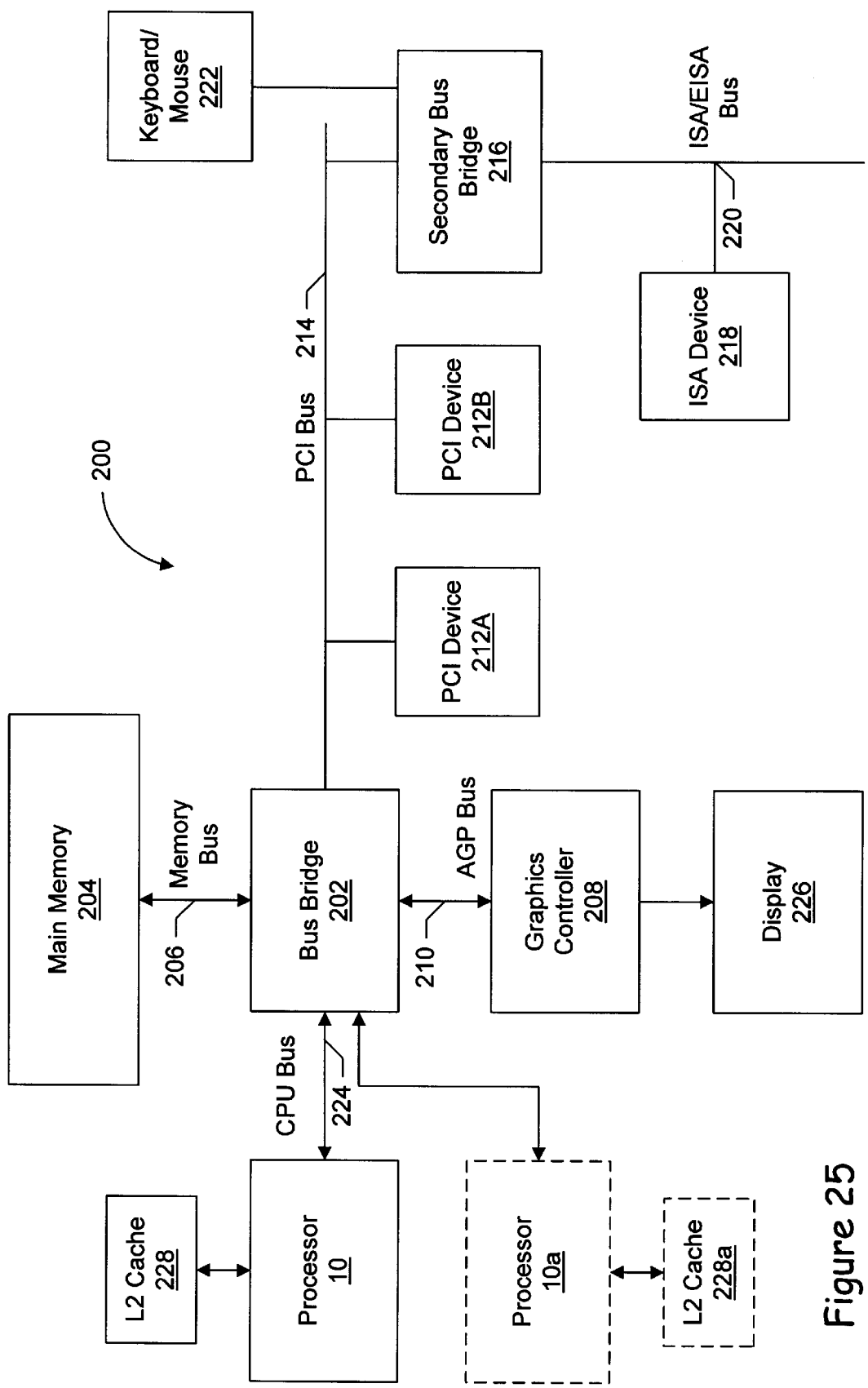
FIG. 25 is a block diagram of one embodiment of a computer system including the microprocessor shown in FIG. 1.

Turning now to FIG. 25, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 20. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures that can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 26) or may share CPU bus 224 with processor 10. Furthermore, processor 10a may be coupled to an optional L2 cache 228a similar to L2 cache 228.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a variety of ways, but generally involves modifying the value such that it is ignored by logic circuitry that receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A branch prediction mechanism comprising:
    a branch prediction storage coupled to receive a fetch address, wherein said branch prediction storage is configured to store a branch prediction corresponding to a branch, wherein said branch corresponds to said fetch address, and wherein said branch prediction includes a corresponding branch prediction history consisting of a single bit, wherein said branch prediction history indicates said branch is either strongly taken or weakly taken; and
    a control circuit configured to update said branch prediction.

2. The branch prediction mechanism as recited in claim 1, wherein said control circuit is configured to store said branch prediction corresponding to said fetch address in response to detecting a first condition, wherein said control circuit is configured to update said branch prediction by toggling said branch prediction history bit to indicate said branch is strongly taken, in response to detecting a second condition, wherein said control circuit is configured to update said branch prediction by toggling said branch prediction history bit to indicate said branch is weakly taken, in response to detecting a third condition, wherein said control circuit is configured to update said branch prediction by removing said branch prediction from said storage in response to detecting a fourth condition.

3. The branch prediction mechanism as recited in claim 1, wherein said branch prediction is updated by said control circuit, wherein if a branch which was predicted to be not taken is detected to be taken, and a branch prediction does not exist in said storage for said branch, said control circuit is configured to create an entry in said storage for said branch and to initialize said history bit to "0", wherein if a branch which was predicted to be taken is detected to be taken, and a branch prediction does exist in said storage for said branch and said history bit for said branch prediction is detected to be "0", said control circuit is configured to set said history bit to "1", wherein if a branch which was predicted to be taken is detected to be not taken, and said history bit for said branch prediction is detected to be "1", said control circuit is configured to set said history bit to "0", wherein if a branch which was predicted to be taken is detected to be not taken, and said history bit for said branch prediction is detected to be "0", said control circuit is configured to remove said branch prediction from said storage.

4. The branch prediction mechanism as recited in claim 1, wherein a group of contiguous instruction bytes are fetched from an instruction cache, wherein said group of contiguous instruction bytes comprises a plurality of byte ranges, wherein said branch prediction storage is configured to store a plurality of branch selectors corresponding to said group of contiguous instruction bytes, wherein each one of said plurality of branch selectors corresponds to a different one of said plurality of byte ranges, wherein each one of said plurality of branch selectors identifies a branch prediction.

5. The branch prediction mechanism as recited in claim 4, wherein said control circuit is configured to initialize and store said branch selectors corresponding to said fetch address in response to detecting a first condition, wherein said control circuit is configured to update said branch prediction by modifying said branch selectors to indicate said branch is predicted taken and initializing said history bit to indicate said branch is weakly taken, in response to detecting a second condition, wherein said control circuit is configured to update said branch prediction by toggling said branch prediction history bit to indicate said branch is strongly taken, in response to detecting a third condition, wherein said control circuit is configured to update said branch prediction by toggling said branch prediction history bit to indicate said branch is weakly taken, in response to detecting a fourth condition, wherein said control circuit is configured to update said branch prediction by modifying said branch selectors to indicate elimination of said branch prediction from said storage in response to detecting a fifth condition.

6. The branch prediction mechanism as recited in claim 5, wherein said first condition is a detection of a fetch address which corresponds to a group of instructions with no corresponding branch selection entries in said storage, wherein said second condition is a detection of a taken branch which was predicted to be not taken, wherein said third condition is a detection of a taken branch which was predicted to be taken, wherein said history bit is detected to indicate said branch is weakly taken, wherein said fourth condition is a detection of a not taken branch which was predicted to be taken, wherein said history bit is detected to indicate said branch is strongly taken, wherein said fifth condition is a detection of a not taken branch which was predicted to be taken, wherein said history bit is detected to indicate said branch is weakly taken.

7. The branch prediction mechanism as recited in claim 6, wherein said control circuit is configured to set said history bit to "0" to indicate said branch is weakly taken, and wherein said control circuit is configured to set said history bit to "1" to indicate said branch is strongly taken.

8. The branch prediction mechanism as recited in claim 6, wherein at most a predetermined number of branch instructions within said group of instructions have a corresponding predicted taken branch prediction within said branch selectors, wherein, in response to detecting said second condition and detecting said predetermined number of branch instructions currently have corresponding predicted taken branch predictions within said branch selectors, said control circuit is configured to update said branch prediction by modifying said branch selectors to eliminate an existing predicted taken branch prediction prior to modifying said branch selectors to indicate said branch is predicted taken and initializing said history bit to indicate said branch is weakly taken.

9. The branch prediction mechanism as recited in claim 8, wherein said predetermined number of branch instructions is two.

10. The branch prediction mechanism as recited in claim 9, wherein said branch selectors are initialized by modifying a branch selector corresponding to said branch instruction and branch selectors corresponding to instructions within said group which are prior to said branch, but occurring after existing predicted taken branch instructions, to indicate said branch is predicted taken.

11. The branch prediction mechanism as recited in claim 10, wherein said elimination of a branch prediction comprises modifying said branch selectors which indicate said branch is predicted taken to indicate said branch is predicted not taken.

12. A method for performing branch prediction comprising:

storing a branch prediction in response to detecting a first condition, wherein said branch prediction includes a single history bit to indicate said branch is strongly taken or weakly taken, wherein said history bit is initialized to indicate said branch is weakly taken;

toggling said history bit in response to detecting a taken branch which was predicted to be taken, if said history bit indicates said branch is weakly taken;

toggling said history bit in response to detecting a not taken branch which was predicted to be taken, if said history bit indicates said branch is strongly taken;

removing said branch prediction from said storage in response to detecting a not taken branch which was predicted to be taken, if said history indicates said branch is weakly taken.

13. The method for performing branch prediction as recited in claim 12,
wherein said detecting said first condition comprises a taken branch which was predicted to be not taken.

14. The method for performing branch prediction as recited in claim 13,
wherein said removing comprises deleting reference to said branch from said storage.

15. A method for performing branch prediction comprising:
receiving a fetch address to a branch prediction storage and an instruction cache;
fetching a group of contiguous instruction bytes corresponding to said fetch address from said instruction cache, wherein said group of contiguous instruction bytes comprises a plurality of byte ranges;
storing a plurality of branch selectors corresponding to said group of contiguous instruction bytes, wherein each one of said plurality of branch selectors corresponds to a different one of said plurality of byte ranges, wherein each one of said plurality of branch selectors identifies a branch prediction, wherein said branch prediction includes a single bit to indicate the branch prediction history for said branch prediction, wherein said bit indicates said branch is strongly taken or weakly taken;
toggling said history bit in response to detecting a taken branch which was predicted to be taken, wherein said history bit is detected to be "0";
toggling said history bit in response to detecting a not taken branch which was predicted to be taken, wherein said history bit is detected to be "1"; and
modifying said branch selectors to indicate said branch is predicted to be not taken, in response to detecting a not taken branch which was predicted to be taken, wherein said history bit is detected to be "0".

16. A microprocessor comprising:
an instruction cache coupled to receive a fetch address and to provide a group of contiguous instruction bytes in response to said fetch address; and
a branch prediction unit, wherein said branch prediction unit is configured to store a branch prediction corresponding to a branch, wherein said branch prediction includes a corresponding, branch prediction history consisting of a single bit to indicate a branch prediction history for said branch prediction, wherein said history bit indicates said branch is either strongly taken or weakly taken, wherein said branch prediction unit is configured to update said branch prediction by toggling said history bit in response to detecting a first condition, wherein said branch prediction unit is configured to update said branch prediction by toggling said history bit in response to detecting a second condition, wherein said branch prediction unit is configured to update said branch prediction by removing said branch prediction in response to detecting a third condition.

17. The microprocessor as recited in claim 16,
wherein said group of contiguous instruction bytes comprises a plurality of byte ranges, wherein said branch prediction storage is configured to initialize and store a plurality of branch selectors corresponding to said group of contiguous instruction bytes, wherein each one of said plurality of branch selectors corresponds to a different one of said plurality of byte ranges, wherein each one of said plurality of branch selectors identifies a branch prediction, wherein said branch prediction unit is configured to update said branch prediction by modifying said branch selectors to indicate said branch is predicted taken and initializing said history bit to indicate said branch is weakly taken, in response to detecting a second condition, wherein said branch prediction unit is configured to update said branch prediction by toggling said branch prediction history bit to indicate said branch is strongly taken, in response to detecting a third condition, wherein said branch prediction unit is configured to update said branch prediction by toggling s aid branch prediction history bit to indicate said branch is weakly taken, in response to detecting a fourth condition, wherein said branch prediction unit is configured to update said branch prediction by modifying said branch selectors to indicate elimination of said branch prediction from said storage in response to detecting a fifth condition.

18. A computer system comprising:
a processor, wherein said processor includes,
an instruction cache coupled to receive a fetch address and to provide a group of contiguous instruction bytes in response to said fetch address; and
a branch prediction unit, wherein said branch prediction unit is configured to store a branch prediction corresponding to a branch, wherein said branch prediction includes a corresponding branch prediction history consisting of a single bit to indicate a branch prediction history for said branch, wherein said history bit indicates said branch is either strongly taken or weakly taken, wherein said branch prediction unit is configured to update said branch prediction by toggling said history bit in response to detecting a first condition, wherein said branch prediction unit is configured to update said branch prediction by removing said branch prediction in response to detecting a second condition; and
an I/O device.

19. The computer system recited in claim 18, wherein the I/O device is a modem.

20. The computer system as recited in claim 18,
wherein said group of contiguous instruction bytes comprises a plurality of byte ranges, wherein said branch prediction storage is configured to store a plurality of branch selectors corresponding to said group of contiguous instruction bytes, in response to a first condition, wherein each one of said plurality of branch selectors corresponds to a different one of said plurality of byte ranges, wherein each one of said plurality of branch selectors identifies a branch prediction, wherein said branch prediction unit is configured to update said branch prediction by modifying said branch selectors to indicate said branch is predicted taken and initializing said history bit to indicate said branch is weakly taken, in response to detecting a second condition, wherein said branch prediction unit is configured to update said branch prediction by toggling said branch prediction history bit to indicate said branch is strongly taken, in response to detecting a third condition, wherein said branch prediction unit is configured to update said branch prediction by toggling said branch prediction history bit to indicate said branch is weakly taken, in response to detecting a fourth condition, wherein said branch prediction unit is configured to update said branch prediction by modifying said branch selectors to indicate elimination of said branch prediction from said storage in response to detecting a fifth condition.

21. The computer system as recited in claim 20, wherein said first condition is the detection of a fetch address which corresponds to a group of instructions with no corresponding branch selection entries in said storage, wherein said second condition is the detection of a taken branch which was predicted to be not taken, wherein said third condition is the detection of a taken branch which was predicted to be taken, wherein said history bit is detected to indicate said branch is weakly taken, wherein said fourth condition is the detection of a not taken branch which was predicted to be taken, wherein said history bit is detected to indicate said branch is strongly taken, wherein said fifth condition is the detection of a not taken branch which was predicted to be taken, wherein said history bit is detected to indicate said branch is weakly taken.

\* \* \* \* \*

UNITED STATES PATENT AND TRADEMARK OFFICE
CERTIFICATE OF CORRECTION

PATENT NO. : 6,253,316 B1
DATED : June 26, 2001
INVENTOR(S) : Thang M. Tran, Andrew McBride, and Karthikeyan Muthusamy It is certified that error appears in the above-identified patent and that said Letters Patent is hereby corrected as shown below:

<u>Column 32, claim 17,</u>
Line 14, please delete "s aid", and insert -- said -- in place thereof.

Signed and Sealed this

Twenty-sixth Day of March, 2002

*Attest:*

JAMES E. ROGAN
*Attesting Officer*     *Director of the United States Patent and Trademark Office*